(12) United States Patent
Regan et al.

(10) Patent No.: US 10,272,518 B2
(45) Date of Patent: *Apr. 30, 2019

(54) MULTI-FUNCTIONAL MANUFACTURING TOOL

(71) Applicant: NIKE, Inc., Beaverton, OR (US)

(72) Inventors: Patrick Conall Regan, Singapore (SG); Chih-Chi Chang, Douliu (TW); Kuo-Hung Lee, Douliu (TW); Ming-Feng Jean, Douliu (TW)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,671

(22) Filed: Feb. 8, 2018

(65) Prior Publication Data

US 2018/0178315 A1  Jun. 28, 2018

Related U.S. Application Data

(63) Continuation of application No. 14/816,967, filed on Aug. 3, 2015, now Pat. No. 9,937,585, which is a (Continued)

(51) Int. Cl.
*B32B 37/00* (2006.01)
*B23K 20/10* (2006.01)
(Continued)

(52) U.S. Cl.
CPC ............. *B23K 20/10* (2013.01); *A43D 11/00* (2013.01); *B23K 37/04* (2013.01); (Continued)

(58) Field of Classification Search
CPC ........ B23K 20/10; B23K 37/04; B29C 65/08; B29C 65/7847; B29C 66/41; (Continued)

(56) References Cited

U.S. PATENT DOCUMENTS

| 949,850 A | 2/1910 | Smith |
| 2,572,640 A | 10/1951 | Lovegrove |

(Continued)

FOREIGN PATENT DOCUMENTS

| CH | 687366 A5 | 11/1996 |
| CN | 1993208 A | 7/2007 |

(Continued)

OTHER PUBLICATIONS

Office Action dated Apr. 6, 2018 in European Patent Application No. 12849467.1, 9 pages.

(Continued)

*Primary Examiner* — James D Sells
(74) *Attorney, Agent, or Firm* — Shook, Hardy & Bacon L.L.P.

(57) ABSTRACT

Aspects relate to systems, methods, and apparatus for a manufacturing tool. The manufacturing tool is comprised of a vacuum tool and an ultrasonic welder as a unified manufacturing tool. The manufacturing tool may be used to pick and position a manufacturing part that is then welded with the associated ultrasonic welder.

20 Claims, 15 Drawing Sheets

Related U.S. Application Data continuation of application No. 14/481,501, filed on Sep. 9, 2014, now Pat. No. 9,096,016, which is a continuation of application No. 13/299,908, filed on Nov. 18, 2011, now Pat. No. 8,858,744.

(51) Int. Cl.

| | | |
|---|---|---|
| *B25J 15/06* | (2006.01) | |
| *B29C 65/08* | (2006.01) | |
| *B29C 65/78* | (2006.01) | |
| *B29C 65/00* | (2006.01) | |
| *B23K 37/04* | (2006.01) | |
| *A43D 11/00* | (2006.01) | |
| B65G 47/91 | (2006.01) | |
| B29L 31/50 | (2006.01) | |

(52) U.S. Cl.
CPC .......... *B25J 15/0675* (2013.01); *B29C 65/08* (2013.01); *B29C 65/7847* (2013.01); *B29C 66/41* (2013.01); *B29C 66/8161* (2013.01); *B29C 66/8167* (2013.01); *B29C 66/8322* (2013.01); *B29C 66/92651* (2013.01); *B29C 66/1122* (2013.01); *B29C 66/71* (2013.01); *B29C 66/727* (2013.01); *B29C 66/729* (2013.01); *B29C 66/7294* (2013.01); *B29C 66/9513* (2013.01); *B29C 66/9516* (2013.01); *B29L 2031/505* (2013.01); *B65G 47/91* (2013.01); *Y10T 156/17* (2015.01)

(58) Field of Classification Search
CPC ............ B29C 66/8161; B29C 66/8167; B29C 66/8322; B29C 66/92651; B25J 15/0675; A43D 11/00
USPC ........................................................ 156/73.1
See application file for complete search history.

(56) References Cited

U.S. PATENT DOCUMENTS

| | | | |
|---|---|---|---|
| 3,183,032 A | 5/1965 | Warfel | |
| 3,220,723 A | 11/1965 | Rabinow | |
| 3,357,091 A | 12/1967 | Reissmueller et al. | |
| 3,464,102 A | 9/1969 | Soloff | |
| 3,848,752 A | 11/1974 | Branch et al. | |
| 3,866,876 A | 2/1975 | Adams | |
| 4,185,814 A | 1/1980 | Buchmann et al. | |
| 4,389,064 A | 6/1983 | Laverriere | |
| 4,775,290 A | 10/1988 | Brown et al. | |
| 4,865,680 A | 9/1989 | Pierson | |
| 4,865,687 A | 9/1989 | Pierson | |
| 4,909,022 A | 3/1990 | Kubis et al. | |
| 5,024,574 A | 6/1991 | Wilson et al. | |
| 5,050,919 A | 9/1991 | Yakou | |
| 5,264,069 A | 11/1993 | Dietrich et al. | |
| 5,414,617 A | 5/1995 | Pomerleau et al. | |
| 5,427,301 A | 6/1995 | Pham et al. | |
| 5,480,501 A | 1/1996 | Stewart et al. | |
| 5,609,377 A | 3/1997 | Tanaka | |
| 5,655,700 A | 8/1997 | Pham et al. | |
| 5,772,100 A | 6/1998 | Patrikios | |
| 5,897,882 A | 4/1999 | Gonzalez et al. | |
| 6,127,822 A | 10/2000 | Sasahara et al. | |
| 6,238,503 B1 | 5/2001 | Kakehi | |
| 6,533,885 B2 | 3/2003 | Davis et al. | |
| 6,599,381 B2 | 7/2003 | Urlaub et al. | |
| 6,672,576 B1 | 1/2004 | Walker | |
| 6,718,604 B1 | 4/2004 | Taga et al. | |
| 6,823,763 B1 | 11/2004 | Foster et al. | |
| 6,979,032 B2 | 12/2005 | Damhuis | |
| 7,007,942 B1 | 3/2006 | Stearns et al. | |
| 7,296,834 B2 | 11/2007 | Clark et al. | |
| 7,387,627 B2 | 6/2008 | Erb et al. | |
| 7,476,289 B2 | 1/2009 | White | |
| 7,481,472 B2 | 1/2009 | Cawley et al. | |
| 7,717,482 B2 | 5/2010 | Iwasaki | |
| 8,276,959 B2 | 10/2012 | Kim | |
| 8,696,043 B2 | 4/2014 | Regan et al. | |
| 8,858,744 B2 | 10/2014 | Regan et al. | |
| 8,960,745 B2 | 2/2015 | Regan et al. | |
| 9,010,827 B2 | 4/2015 | Regan et al. | |
| 9,096,016 B2 * | 8/2015 | Regan .................. B25J 15/0675 |
| 2002/0153735 A1 | 10/2002 | Kress | |
| 2003/0062110 A1 | 4/2003 | Urlaub et al. | |
| 2003/0160084 A1 | 8/2003 | Higashiyama | |
| 2003/0164620 A1 | 9/2003 | Schmalz et al. | |
| 2003/0189114 A1 | 10/2003 | Taylor et al. | |
| 2004/0034963 A1 | 2/2004 | Rogers et al. | |
| 2004/0212205 A1 | 10/2004 | Linker, II et al. | |
| 2005/0050669 A1 | 3/2005 | Castello | |
| 2005/0115014 A1 | 6/2005 | Worwag | |
| 2006/0196332 A1 | 9/2006 | Downing et al. | |
| 2006/0277733 A1 | 12/2006 | Boyl-Davis et al. | |
| 2007/0200377 A1 | 8/2007 | Nishio | |
| 2007/0228751 A1 | 10/2007 | Viavattine et al. | |
| 2007/0262598 A1 | 11/2007 | Schaaf et al. | |
| 2007/0290517 A1 | 12/2007 | Nagai et al. | |
| 2009/0035407 A1 | 2/2009 | Mattice et al. | |
| 2009/0108053 A1 | 4/2009 | Huddleston | |
| 2009/0121417 A1 | 5/2009 | Nishimura et al. | |
| 2009/0311087 A1 | 12/2009 | Na et al. | |
| 2010/0040450 A1 | 2/2010 | Parnell | |
| 2010/0264679 A1 | 10/2010 | Moriya | |
| 2010/0296903 A1 | 11/2010 | Shah et al. | |
| 2010/0320786 A1 | 12/2010 | Ko et al. | |
| 2011/0123359 A1 | 5/2011 | Schaaf | |
| 2011/0183108 A1 | 7/2011 | Tachibana | |
| 2011/0232008 A1 | 9/2011 | Crisp | |
| 2011/0254298 A1 | 10/2011 | Lomerson, Jr. | |
| 2011/0278870 A1 | 11/2011 | Omiya et al. | |
| 2012/0126554 A1 | 5/2012 | Becker et al. | |
| 2013/0032981 A1 | 2/2013 | Schaaf | |

FOREIGN PATENT DOCUMENTS

| | | |
|---|---|---|
| CN | 201064906 Y | 5/2008 |
| CN | 101194352 A | 6/2008 |
| CN | 201483812 U | 5/2010 |
| CN | 102161436 A | 8/2011 |
| CN | 102164719 A | 8/2011 |
| DE | 2404197 A1 | 7/1975 |
| DE | 3047717 A1 | 7/1982 |
| DE | 3208864 A1 | 9/1983 |
| DE | 3741091 A1 | 6/1989 |
| DE | 3817615 A1 | 8/1989 |
| DE | 20209985 U1 | 9/2002 |
| EP | 123173 B1 | 3/1988 |
| EP | 405171 A1 | 1/1991 |
| EP | 065373 A2 | 6/1995 |
| EP | 913246 A1 | 5/1999 |
| EP | 1000732 A2 | 5/2000 |
| EP | 790010 B1 | 4/2001 |
| EP | 1227041 A2 | 7/2002 |
| EP | 1586419 A2 | 10/2005 |
| EP | 2042453 B1 | 4/2009 |
| EP | 2060348 A1 | 5/2009 |
| FR | 2617078 A1 | 12/1988 |
| GB | 1249294 A | 10/1971 |
| GB | 1349578 A | 4/1974 |
| JP | H03152091 A | 6/1991 |
| JP | 3234251 A | 10/1991 |
| JP | H0457724 A | 2/1992 |
| JP | H05111882 A | 5/1993 |
| JP | H05139554 A | 6/1993 |
| JP | H0614155 U | 2/1994 |
| JP | H0627765 U | 4/1994 |
| JP | 2000108068 A | 4/2000 |
| JP | 2004174685 A | 6/2004 |
| JP | 2005060063 A | 3/2005 |
| JP | 2006346951 A | 12/2006 |
| TW | 200529997 A | 9/2005 |
| TW | M275054 U | 9/2005 |

(56) References Cited

FOREIGN PATENT DOCUMENTS

| TW | M337576 U | 8/2008 |
|---|---|---|
| WO | 9955186 A1 | 11/1999 |
| WO | 2004062842 A1 | 7/2004 |
| WO | 2006054061 A1 | 5/2006 |

OTHER PUBLICATIONS

Office Action dated May 7, 2018 in European Patent Application No. 12849800.3, 7 pages.
Decision to Grant in European Patent Application No. 12850479.5, dated Jun. 21, 2018, 1 page.
Communication Pursuant to Article 94(3) EPC in European Patent Application 12850394.3, dated Jul. 18, 2018, 5 pages.
Extended Search Report dated Oct. 19, 2018 in European Patent Application No. 18183589.3, 13 pages.

* cited by examiner

MULTI-FUNCTIONAL MANUFACTURING TOOL

CROSS-REFERENCE TO RELATED APPLICATIONS AND CLAIM OF PRIORITY

This application is a continuation of co-pending U.S. patent application Ser. No. 14/816,967, filed Aug. 3, 2015, titled "Multi-Functional Manufacturing Tool," which is a continuation of U.S. patent application Ser. No. 14/481,501, filed Sep. 9, 2014, titled "MULTI-FUNCTIONAL MANUFACTURING TOOL," which is a continuation of U.S. patent application Ser. No. 13/299,908, filed Nov. 18, 2011, titled "MULTI-FUNCTIONAL MANUFACTURING TOOL," each of which is incorporated herein by reference in its entirety. This application is also related by subject matter to the following concurrently filed U.S. Patent Applications: U.S. patent application Ser. No. 13/299,856, titled "AUTOMATED IDENTIFICATION OF SHOE PARTS;" U.S. patent application Ser. No. 13/299,890, titled "HYBRID PICKUP TOOL;" U.S. patent application Ser. No. 13/299,934, titled "MANUFACTURING VACUUM TOOL;" and U.S. patent application Ser. No. 13/299,872, titled "AUTOMATED IDENTIFICATION AND ASSEMBLY OF SHOE PARTS," each of which is also incorporated herein by reference in its entirety.

BACKGROUND

Traditionally, parts used in manufacturing a product are picked up and placed in a position for manufacturing by human hand or robotic means. However, current robotic means have not provided a level of control, dexterity, and effectiveness to be cost-effectively implemented in some manufacturing systems.

Automated manufacturing systems that implement a variety of processes have traditionally relied on discrete mechanisms to implement each of the different processes. However, having automation machinery dedicated to a primarily-discrete task may be inefficient from a production perspective and from a cost perspective.

SUMMARY

Aspects of the present invention relate to systems, methods and apparatus for a manufacturing tool. The manufacturing tool is comprised of a vacuum tool and an ultrasonic welder as a unified manufacturing tool. The manufacturing tool may be used to pick and position a manufacturing part that is then welded with the associated ultrasonic welder.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
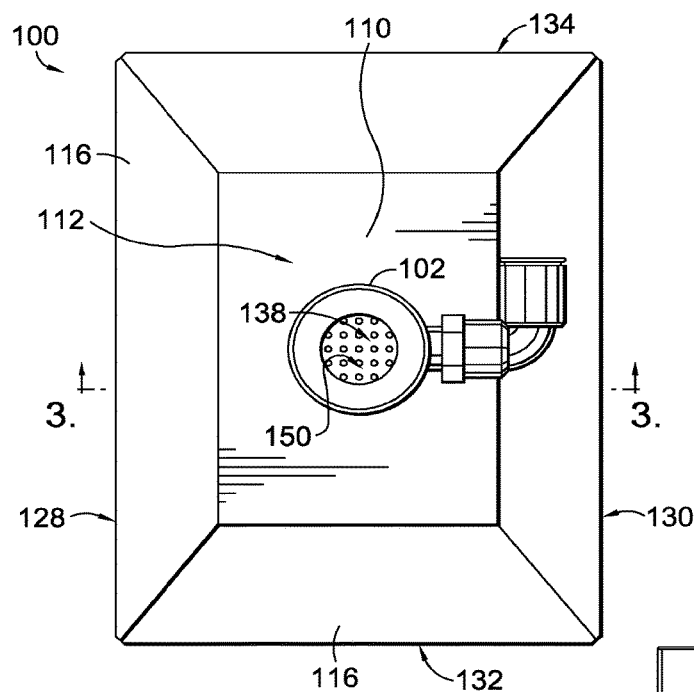
FIG. 1 depicts a top-down view of an exemplary vacuum tool, in accordance with embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Aspects of the present invention relate to systems, methods, and apparatus for a manufacturing tool. The manufacturing tool is highly adaptable for use with a variety of materials, a variety of shapes, a variety of part sizes, a variety of manufacturing processes, and a variety of location within an automated manufacturing system. This high level of adaptability provides a manufacturing tool that is a critical component in an automated manufacturing process. To accomplish this, the manufacturing tool is comprised of a vacuum tool and an ultrasonic welder as a unified manufacturing tool that is able to be manipulated from a single positional member. The manufacturing tool may be used to pick and position a manufacturing part that is then welded with the associated ultrasonic welder.

Accordingly, in one aspect, the present invention provides a manufacturing tool. The manufacturing tool is comprised of a vacuum-powered part holder having a bottom surface adapted for contacting a manufacturing part. The manufacturing tool is further comprised of an ultrasonic-welding horn coupled to the vacuum-powered part holder. The ultrasonic-welding horn is comprised of a distal end adapted for contacting the manufacturing part such that the distal end extends at least to a plane defined by the vacuum-powered part holder bottom surface.

In another aspect, the present invention provides a method of joining a plurality of manufacturing parts utilizing a manufacturing tool comprised of a vacuum-powered part holder and an ultrasonic-welding horn. The method comprises positioning the manufacturing tool such that the vacuum-powered part holder is near a first manufacturing part. The method is further comprised of generating a vacuum force that is transferred through a bottom surface of the vacuum-powered part holder. The method is further comprised of temporarily maintaining the first manufacturing part in contact with at least a portion of the vacuum-powered part holder. Additionally, the method is comprised of transferring the first manufacturing part to a second manufacturing part of the plurality of manufacturing parts. The method is further comprised of releasing the first manufacturing part from the vacuum-powered part holder. Additionally, the method is comprised of positioning the manufacturing tool such that the ultrasonic-welding horn is near the first manufacturing part where the first manufacturing part is contacting the second manufacturing part. The method is also comprised of applying ultrasonic energy through the ultrasonic-welding horn. The ultrasonic energy is effective for joining the first manufacturing part with the second manufacturing part.

A third aspect of the present invention provides a manufacturing tool. The manufacturing tool is comprised of a vacuum-powered part holder. The vacuum-powered part holder is comprised of a plurality of vacuum distributors. Each of the plurality of vacuum distributors is coupled to at least one other vacuum distributor of the plurality of vacuum distributors. The vacuum-powered part holder is further comprised of a plurality of vacuum generators. Each of the plurality of vacuum generators is coupled to an associated vacuum distributor of the plurality of vacuum distributors. The vacuum-powered part holder is further comprised of a manufacturing-part-contacting surface. The manufacturing-part-contacting surface is coupled to the plurality of vacuum distributors. The manufacturing tool is further comprised of an ultrasonic welding horn. The ultrasonic welding horn is coupled, at least in part, to the vacuum-powered part holder such that the ultrasonic welding horn and the vacuum powered part holder are moveable in coordination.

Having briefly described an overview of embodiments of the present invention, a more detailed description follows.

FIG. 1 depicts a top-down view of an exemplary vacuum tool 100, in accordance with embodiments of the present invention. In various aspects, the vacuum tool 100 may also be referred to as a vacuum-powered part holder. For example, the vacuum tool 100 may be useable in an automated (or partially automated) manufacturing process for the movement, positioning, and/or maintaining of one or more parts. The parts manipulated by the vacuum tool 100 may be rigid, malleable, or any combination of characteristics (e.g., porous, non-porous). In an exemplary aspect, the vacuum tool 100 is functional for picking and placing a part constructed, at least in part, of leather, polymers, textiles, rubber, foam, mesh, and/or the like.

The material to be manipulated by a vacuum tool may be of any type. For example, it is contemplated that a vacuum tool described herein is adapted for manipulating (e.g., picking and placing) flat, thin, and/or lightweight parts of various shapes, materials, and other physical characteristics (e.g. pattern cut textiles, non-woven materials, mesh, plastic sheeting material, foams, rubber). Therefore, unlike industrial-scaled vacuum tools functional for manipulating a heavy, rigid, or non-porous material, the vacuum tools provided herein are able to effectively manipulate a variety of materials (e.g., light, porous, flexible).

The vacuum tool 100 is comprised of a vacuum generator 102. The vacuum generator generates a vacuum force (e.g., low pressure gradient relative to ambient conditions). For example, the vacuum generator may utilize traditional vacuum pumps operated by a motor (or engine). The vacuum generator may also utilize a venturi pump to generate a vacuum. Further yet, it is contemplated that an air amplifier, which is also referred to as a coandă effect pump, is also utilized to generate a vacuum force. Both the venturi pump and the coandă effect pump operate on varied principles of converting a pressurized gas into a vacuum force effective for maintaining a suction action. While the following disclosure will focus on the venturi pump and/or the coandă effect pump, it is contemplated that the vacuum generator may also be a mechanical vacuum that is either local or remote (coupled by way of tubing, piping, and the like) to the vacuum tool 100.

The vacuum tool 100 of FIG. 1 is also comprised of a vacuum distributor 110. The vacuum distributor 110 distributes a vacuum force generated by the vacuum generator 102 across a defined surface area. For example, a material to be manipulated by the vacuum tool 100 may be a flexible material of several square inches in surface area (e.g., a leather portion for a shoe upper). As a result of the material being at least semi-flexible, the vacuum force used to pick up the part may be advantageously dispersed across a substantial area of the part. For example, rather than focusing a suction effect on a limited surface area of a flexible part, which may result in bending or creasing of the part once support underneath of the part is removed (e.g., when the part is lifted), dispersing the suction effect across a greater area may inhibit an undesired bending or creasing of the part. Further, it is contemplated that a concentrated vacuum (non-dispersed vacuum force) may damage a part once a sufficient vacuum is applied. Therefore, in an aspect of the present invention, the vacuum force generated by the vacuum generator 102 is distributed across a larger potential surface area by way of the vacuum distributor 110.

In an exemplary aspect, the vacuum distributor 110 is formed from a semi-rigid to rigid material, such as metal (e.g., aluminum) or polymers. However, other materials are contemplated. The vacuum tool 100 is contemplated as being manipulated (e.g. moved/positioned) by a robot, such as a multi-axis programmable robot. As such, limitations of a robot may be taken into consideration for the vacuum tool 100. For example, weight of the vacuum tool 100 (and/or a manufacturing tool 10 to be discussed hereinafter) may be desired to be limited in order to limit the potential size and/or costs associated with a manipulating robot. Utilizing weight as a limiting factor, it may be advantageous to form the vacuum distributor in a particular manner to reduce weight while still achieving a desired distribution of the vacuum force.

Other consideration may be evaluated in the design and implementation of the vacuum tool 100. For example, a desired level of rigidity of the vacuum tool 100 may result in reinforcement portions and material removed portions, as will be discussed with respect to FIG. 17 hereinafter, being incorporated into the vacuum tool 100.

The vacuum distributor 110 is comprised of an exterior top surface 112 and an exterior side surface 116. FIG. 1 depicts a vacuum distributor with a substantially rectangular footprint. However, it is contemplated that any footprint may be utilized. For example, a non-circular footprint may be utilized. A non-circular footprint, in an exemplary aspect, may be advantageous as providing a larger useable surface area for manipulating a variety of part geometries. Therefore, the use of a non-circular footprint may allow for a greater percentage of the footprint to be in contact with a manipulated part as compared to a circular footprint. Also with respect to shape of a vacuum tool 100 beyond the footprint, it is contemplated, as will be discussed hereinafter, that any three-dimensional geometry may be implemented for the vacuum distributor 110. For example, an egg-like geometry, a pyramid-like geometry, a cubical-like geometry, and the like may be utilized.

The exemplary vacuum distributor 110 of FIG. 1 is comprised of the exterior top surface 112 and a plurality of exterior side surfaces 116. The vacuum distributor 110 also terminates at edges resulting in a first side edge 128, a second parallel side edge 130, a front edge 132, and an opposite parallel back edge 134.

Figure 2:
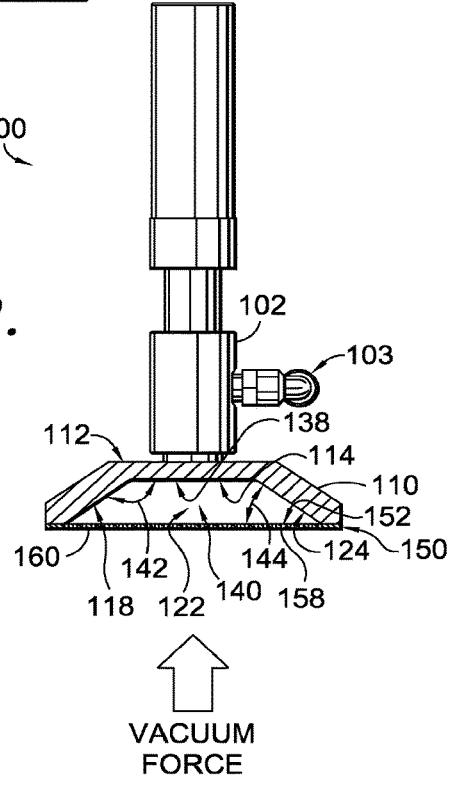
FIG. 2 depicts a front-to-back perspective cut view along a cut line that is parallel to cutline 3-3 of the vacuum tool in FIG. 1, in accordance with aspects of the present invention.

FIG. 1 depicts a cutline 3-3 demarking a parallel view perspective for FIG. 2. FIG. 2 depicts a front-to-back perspective cut view that is parallel along cut line 3-3 of the vacuum tool 100, in accordance with aspects of the present invention. FIG. 2 depicts, among other features, a vacuum distribution cavity 140 and a vacuum plate 150 (also sometimes referred to as the "plate" herein). The vacuum distributor 110 and the plate 150, in combination, define a volume of space forming the vacuum distribution cavity 140. The vacuum distribution cavity 140 is a volume of space that allows for the unobstructed flow of gas to allow for an equalized dispersion of a vacuum force. In an exemplary aspect, the flow of gas (e.g., air) from the plate 150 to the vacuum generator 102 is focused through the utilization of angled interior side surface(s) 118. As depicted in FIG. 2, there are four primary interior side surfaces, a first interior side surface 120, a second interior side surface 122, a third interior side surface 124, and a fourth interior side surface 126 (not shown). However, it is contemplated that other geometries may be utilized.

The interior side surfaces 118 extend from the interior top surface 114 toward the plate 150. In an exemplary aspect, an obtuse angle 142 is formed between the interior top surface and the interior side surfaces 118. The obtuse angle provides an air vacuum distribution effect that reduces internal turbulence of air as it passes from the plate 150 toward a vacuum aperture 138 serving the vacuum generator 102. By angling the approach of air as it enters the vacuum aperture 138, a reduced amount of material may be utilized with the vacuum distributor 110 (e.g., resulting in a potential reduction in weight) and the flow of air may be controlled through a reduction in air turbulence. An angle 144 may also be defined by the intersection of the interior side surfaces 118 and the plate 150.

The plate 150, which will be discussed in greater detail in FIGS. 5-15 hereinafter, has an interior plate surface 152 (i.e., top surface) and an opposite exterior plate surface 158 (i.e., bottom surface). The exterior plate surface 158 is adapted for contacting a part to be manipulated by the vacuum tool 100. For example, the plate 150 in general, or the exterior plate surface 158 in particular, may be formed from a non-marring material. For example, aluminum or a polymer may be used to form the plate 150 in whole or in part. Further, it is contemplated that the plate 150 is a semi-rigid or rigid structure to resist forces exerted on it from the vacuum generated by the vacuum generator 102. Therefore, the plate 150 may be formed of a material having a sufficient thickness to resist deforming under pressures created by the vacuum generator 102. Additionally, it is contemplated that the plate 150 is formed from a material that conforms, in part, to an item to be manipulated. For example, the plate 150 may be constructed from a mesh-like material having a plurality of apertures defined by voids in the mesh-like material (e.g., textile mesh, metal mesh).

When used in combination, the vacuum generator 102, the vacuum distributor 110, and the plate 150, the vacuum tool 100 is functional to generate a suction force that draws a material towards the exterior plate surface 158 (also referred to as a manufacturing-part-contacting surface) where the material is maintained against the plate 150 until the force applied to the material is less than a force repelling (e.g., gravity, vacuum) the material from the pate 150. In use, the vacuum tool is therefore able to approach a part, generate a vacuum force capable of temporarily maintaining the part in contact with the plate 150, move the vacuum tool 100 and the part to a new location, and then allow the part to release from the vacuum tool 100 at the new position (e.g., at a new location, in contact with a new material, at a new manufacturing process, and the like).

Figure 3:
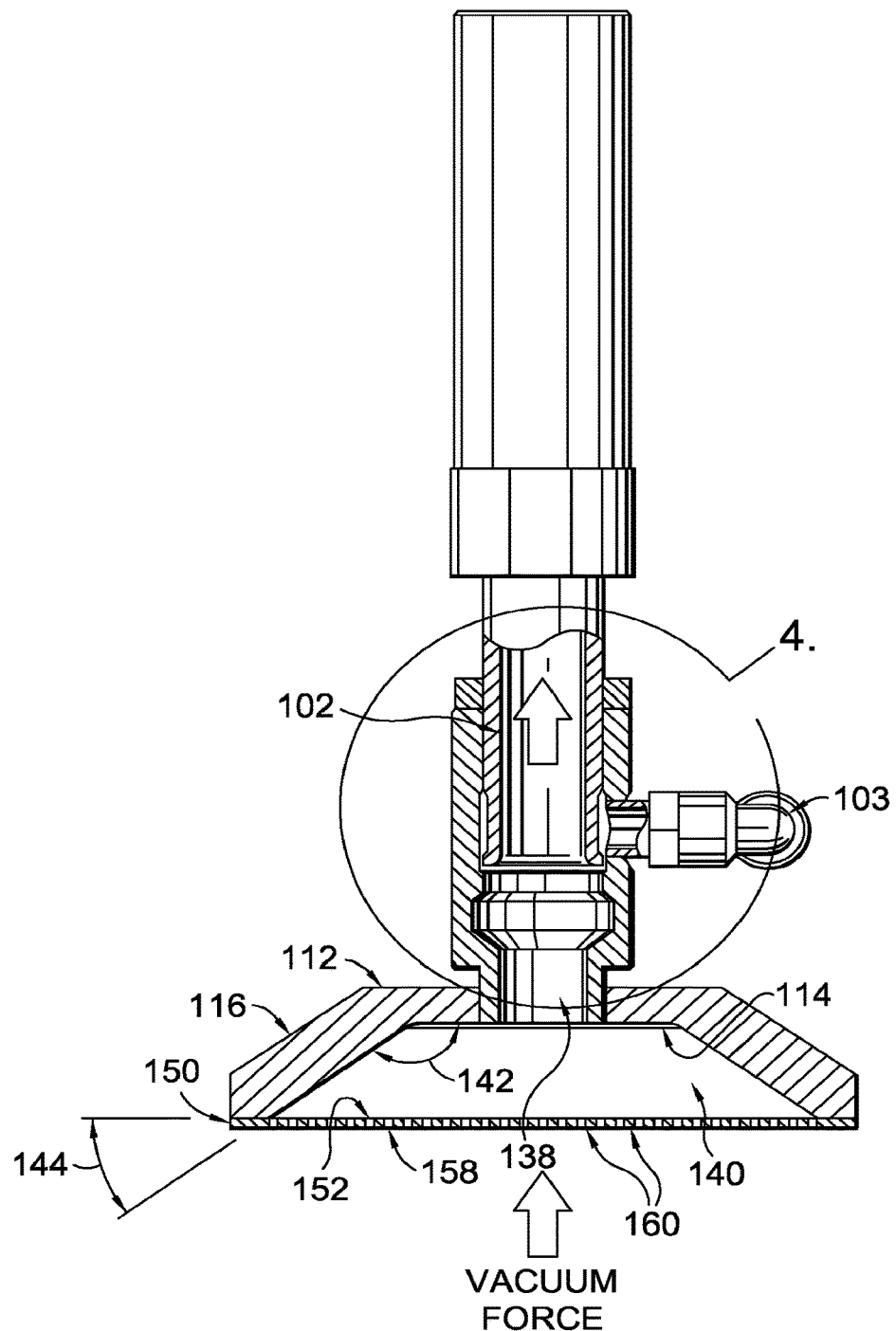
FIG. 3 depicts a front-to-back view of the vacuum tool along the cutline 3-3 of FIG. 1, in accordance with aspects of the present invention.

FIG. 3 depicts a front-to-back view of the vacuum tool 100 along the cutline 3-3 of FIG. 1, in accordance with aspects of the present invention. In particular, FIG. 3 provides a cut view of the vacuum generator 102. As will be discussed in greater detail with respect to FIG. 4, the vacuum generator 102, in the exemplary aspect, is an air amplifier utilizing a coandă effect to generate a vacuum force.

In this example, air is drawn from the exterior plate surface 158 through a plurality of apertures 160 through the plate 150 to the vacuum distribution cavity 140. The vacuum distribution cavity 140 is enclosed between the vacuum distributor 110 and the plate 150, such that if the plate 150 is a non-porous (i.e., lacked the plurality of apertures 160) surface, then an area of low pressure would be generated in the vacuum distribution cavity 140 when the vacuum generator 102 is activated. However, returning to the example including the plurality of aperture 160, the air is drawn into the vacuum distribution cavity 140 towards the vacuum aperture 138, which then allows the air to be drawn into the vacuum generator 102.

Figure 4:
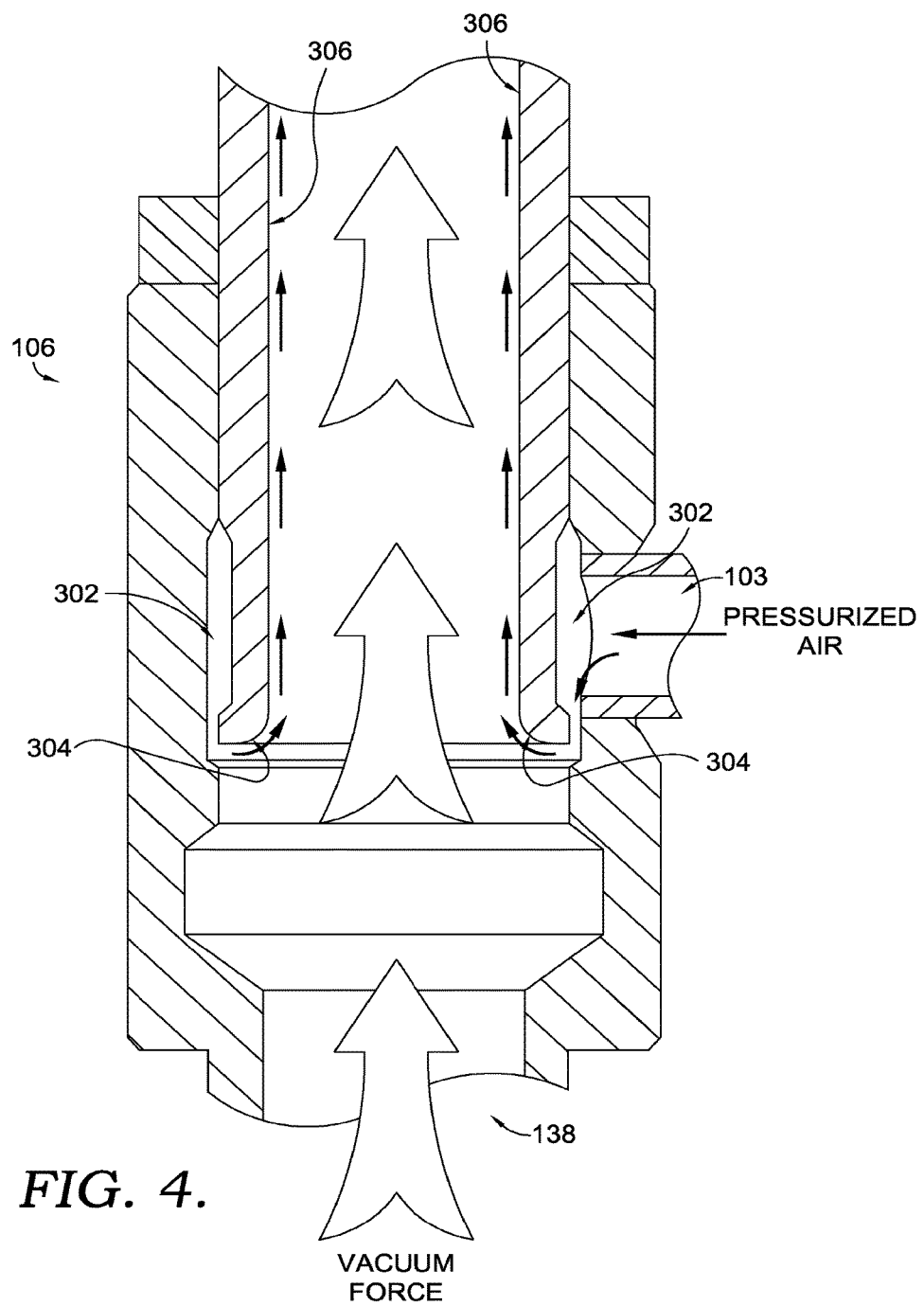
FIG. 4 depicts a focused view of the vacuum generator as cut along the cutline 3-3 from FIG. 1, in accordance with aspects of the present invention.

FIG. 3 identifies a zoomed view of the vacuum generator 102 depicted in FIG. 4. FIG. 4 depicts a focused view of the vacuum generator 102 as cut along the cutline 3-3 from FIG. 1, in accordance with aspects of the present invention. The vacuum generator depicted in FIG. 4 is a coandă effect (i.e., air amplifier) vacuum pump 106. The coandă effect vacuum pump injects pressurized air at an inlet 103. The inlet 103 directs the pressurized air through an internal chamber 302 to a sidewall flange 304. The pressurized air, utilizing the coandă effect, curves around the sidewall flange 304 and flows along an internal sidewall 206. As a result of the pressurized air movement, a vacuum force is generated in the same direction as the flow of the pressurized air along the internal sidewall 306. Consequently, a direction of suction extends up through the vacuum aperture 138.

Figure 5:
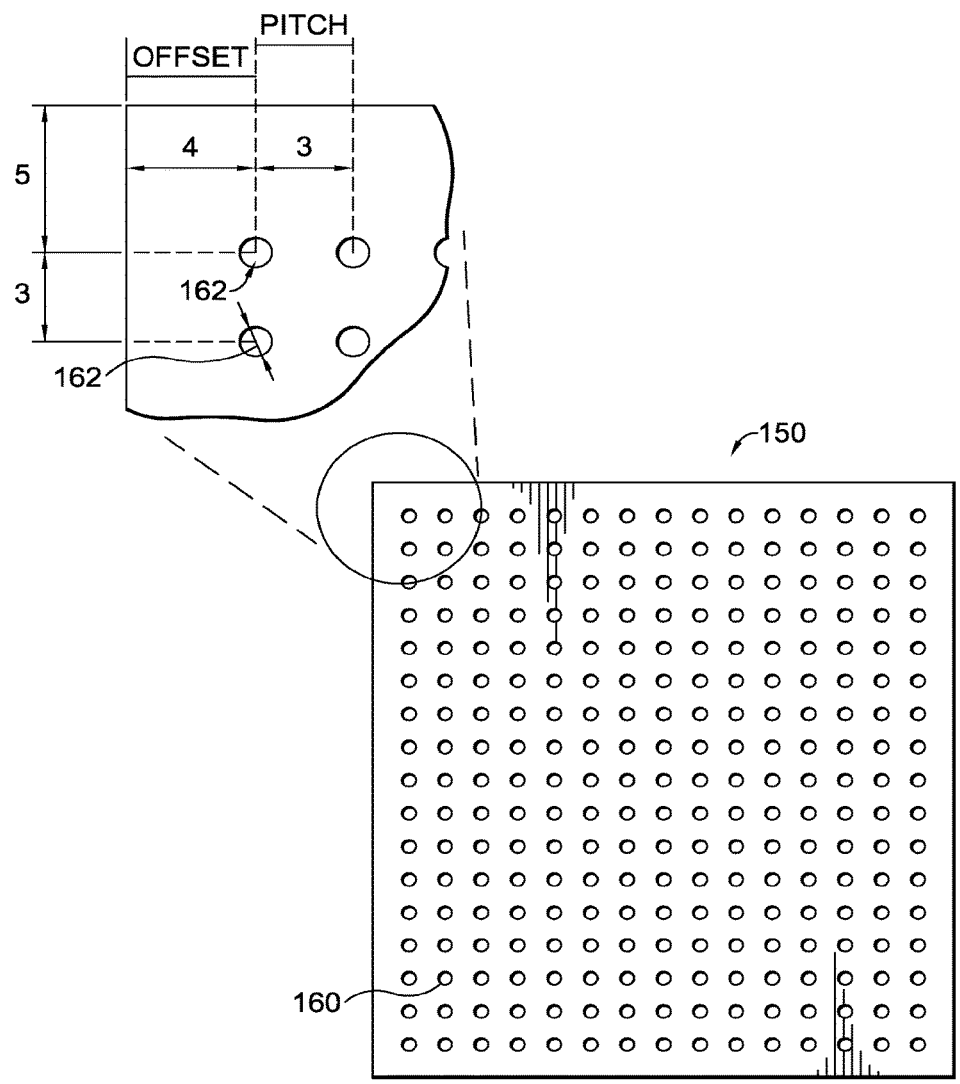
FIG. 5 depicts an exemplary plate comprised of the plurality of apertures, in accordance with aspects of the present invention.

FIG. 5 depicts an exemplary plate 150 comprised of the plurality of apertures 160, in accordance with aspects of the present invention. While the plate 150 is illustrated as having a rectangular footprint, as previously discussed, it is contemplated that any geometry may be implemented (e.g., circular, non-circular) depending, in part, on the material to be manipulated, a robot controlling the vacuum tool 100, and/or components of the vacuum tool 100.

The plurality of apertures 160 may be defined, at least in part, by a geometry (e.g., circular, hatch, bulbous, rectangular), size (e.g., diameter, radius (e.g., radius 166), area, length, width), offset (e.g., offset 169) from elements (e.g., distance from outer edge, distance from a non-porous portion), and pitch (e.g., distance between apertures (e.g., pitch 168)). The pitch of two apertures is defined as a distance from a first aperture (e.g., first aperture 162) to a second aperture (e.g., second aperture 164). The pitch may be measured in a variety of manners. For example, the pitch may be measured from the closest two points of two apertures, from the surface area center of two apertures (e.g., centre of circular apertures), from a particular feature of two apertures.

Depending on desired characteristics of a vacuum tool, the variables associated with the apertures may be adjusted. For example, a non-porous material of low density may not require much vacuum force to maintain the material in contact with the vacuum tool under normal operating conditions. However, a large porous mesh material may, on the other hand, require a significant amount of vacuum force to maintain the material against the vacuum tool under normal operating conditions. Therefore, to limit the amount of energy placed into the system (e.g., amount of pressurized air to operate a coandă effect vacuum pump, electricity to operate a mechanical vacuum pump) an optimization of the apertures may be implemented.

For example, a variable that may be sufficient for typical materials handled in a footwear, apparel, and the like industry may include, but not be limited to, apertures having a diameter between 0.5 and 5 millimeters (mm), between 1 mm and 4 mm, between 1 mm and 3 mm, 1.5 mm, 2 mm, 2.5 mm, 3 mm, and the like. However, larger and smaller diameter (or comparable surface area) apertures are contemplated. Similarly, the pitch may range between 1 mm and 8 mm, between 2 mm and 6 mm, between 2 mm and 5 mm, 3 mm, 3.5 mm, 4 mm, 4.5 mm, 5 mm, 5.5 mm, 6 mm, and the like. However, larger and smaller pitch measurements are contemplated.

Additionally, it is contemplated that a variable size and a variable pitch may be implemented in aspects of the present invention. For example, a compound part composed of both a porous material portion and a non-porous material portion may utilize different variables to accomplish the same level of manipulation. In this example, variables that lead to a reduction in necessary vacuum force in an area to be contacted by the non-porous material and variable that lead to higher vacuum forces in an area to be contacted by the porous material may be implemented. Further, a vision system or other identification system may be used in conjunction to further ensure a proper placement of the material with respect to the plurality of apertures occurs. Additionally, it is contemplated that a relationship between pitch and size may be utilized to locate the plurality of apertures. For example, a pitch from a larger sized aperture may be greater than a pitch from a smaller sized aperture (or vice versa).

An additional variable is the offset. In an exemplary aspect, the offset is a distance of an aperture from an outside edge of the plate 150. Different apertures may have different offsets. Further different edges may implement different offsets. For example an offset along a front edge may be different from an offset along a side edge. The offset may range from no offset to 8 mm (or more). In practice, an offset ranging from 1 mm to 5 mm may accomplish characteristics of exemplary aspects of the present invention.

The plurality of apertures 160 may be formed in the plate 150 utilizing a number of manufacturing techniques. For example apertures may be punched, drilled, etched, carved, melted, and/or cut from the plate 150. In an exemplary embodiment, the plate 150 is formed from a material that is responsive to laser cutting. For example polymer-based materials and some metal-based materials may be used in conjunction with laser cutting of the plurality of apertures.

Figure 6:
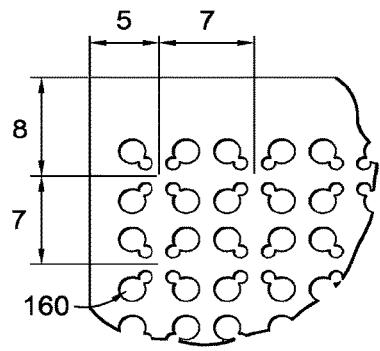
FIGS. 6-15 depict various aperture variations in a plate, in accordance with aspects of the present invention.
Figure 7:
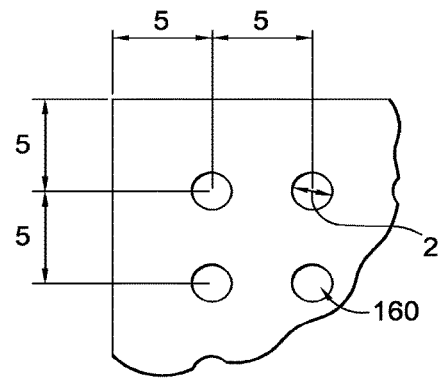
Figure 8:
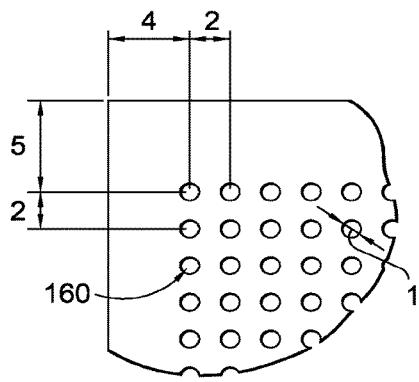
Figure 9:
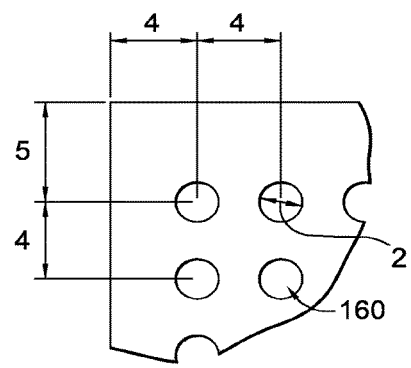
Figure 10:
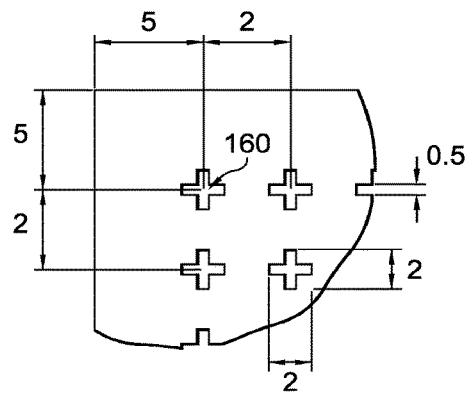
Figure 11:
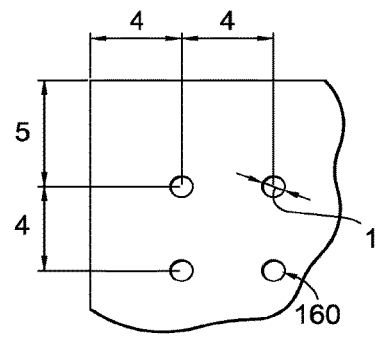
Figure 12:
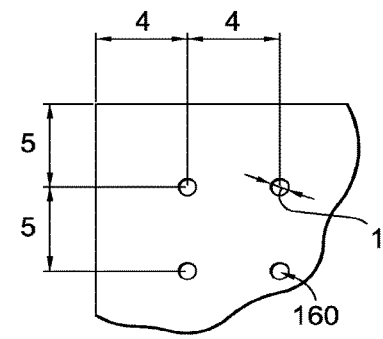
Figure 13:
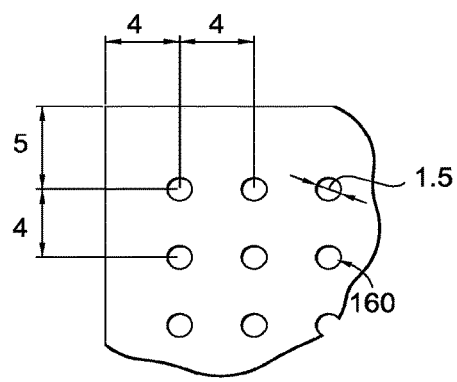
Figure 14:
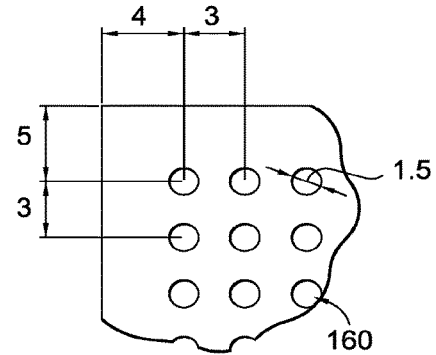
Figure 15:
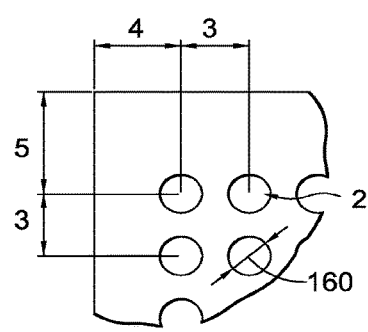

FIGS. 6-15 provide exemplary aperture variable selections similar to that discussed with respect to FIG. 5, in accordance with aspects of the present invention. The following examples are not intended to be limiting, but instead exemplary in nature. FIG. 6 depicts non-circular apertures having a first offset of 5 mm and a second offset of 8 mm and a pitch of 7 mm. FIG. 7 depicts circular apertures having an offset and pitch of 5 mm with a diameter of 2 mm. FIG. 8 depicts circular apertures having a diameter of 1 mm, a pitch of 2 mm, and offsets of 4 mm and 5 mm. FIG. 9 depicts circular apertures having a diameter of 2 mm, a pitch of 4 mm, and offsets of 5 mm and 4 mm. FIG. 10 depicts exemplary geometric apertures having a pitch of 4 mm and offsets of 5 mm. FIG. 11 depicts circular apertures having a diameter of 1 mm, a pitch of 4 mm, and offsets of 5 mm and 4 mm. FIG. 12 depicts circular apertures having a diameter of 1 mm, a pitch of 5 mm, and offsets of 5 mm. FIG. 13 depicts circular apertures having a diameter of 1.5 mm, a pitch of 4 mm, and offsets of 5 mm and 4 mm. FIG. 14 depicts circular apertures having a diameter of 1.5 mm, a pitch of 3 mm, and offsets of 4 mm. FIG. 15 depicts circular apertures having a diameter of 2 mm, a pitch of 3 mm, and offsets of 5 mm and 4 mm. As previously discussed, it is contemplated that shape, size, pitch, and offset may be altered uniformly or variably in any combination to achieve a desired result.

Figure 16:
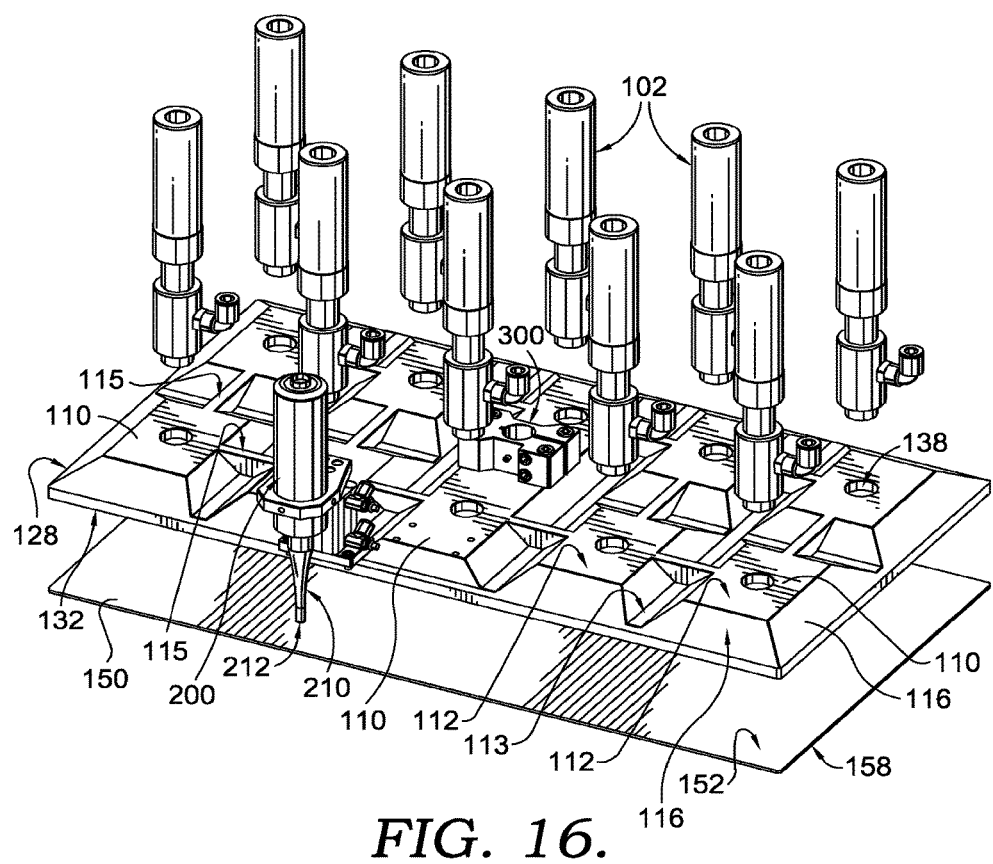
FIG. 16 depicts an exploded view of a manufacturing tool comprised of a vacuum tool and an ultrasonic welder, in accordance with aspects of the present invention.

FIG. 16 depicts an exploded view of a manufacturing tool 10 comprised of a vacuum tool 100 and an ultrasonic welder 200, in accordance with aspects of the present invention. Unlike the vacuum tool 100 discussed with respect to FIGS. 1 and 2, the vacuum tool 100 of FIG. 16 incorporates a plurality of vacuum generators 102, vacuum distributors 110, and vacuum distribution cavities 140 into a unified vacuum tool 100. As will be discussed hereinafter, advantages may be realized by the ability to selectively activate/deactivate vacuum force in individual portions of the vacuum tool 100. Additionally, a greater control of continuous vacuum force may be achieved by having segregated portions of the vacuum tool 100.

The manufacturing tool 10 also is comprised of a coupling member 300. The coupling member 300 is a feature of the manufacturing tool 10 (or the vacuum tool 100 or the ultrasonic welder 200 individually) allowing a positional member 310 (not shown) to manipulate the position, attitude, and/or orientation of the manufacturing tool 10. For example, the coupling member 300 may allow for the addition of the manufacturing tool to a computer-numerically-controlled (CNC) robot that has a series of instruction embodied on a non-transitory computer-readable medium, that when executed by a processor and memory, cause the CNC robot to perform a series of steps. For example, the CNC robot may control the vacuum generator(s) 102, the ultrasonic welder 200, and/or the position to which the manufacturing tool 10 is located. The coupling member 300 may, therefore, allow for the temporary or permanent coupling of the manufacturing tool 10 to a positional member 310, such as a CNC robot.

As was previously discussed, aspects of the present invention may form portions of the manufacturing tool 10 with the intention of minimizing mass. As such, the plurality of vacuum distributors 110 of FIG. 16 include reduced material portions 113. The reduced material portions 113 eliminate portions of what could otherwise be a uniform exterior top surface. The introduction of reduced material portions 113 reduces weight of the manufacturing tool 10 to allow for a potentially smaller positional member 310 to be utilized, which may save on space and costs. Additional locations for reduced material portions 113 are contemplated about the vacuum tool 100 (e.g., side, bottom, top).

However, aspects of the present invention may desire to remain a level of rigidity of the plurality of vacuum distributors 110 as supported by a single coupling member 300. To maintain a level of rigidity while still introducing the reduced material portions 113, reinforcement portions 115 may also be introduced. For example, reinforcement portions 115 may extend from one vacuum distributor 110 to another vacuum distributor 110. Further yet, it is contemplated that in aspects of the present invention, reinforcement portions 115 may be included proximate the coupling member 300 for a similar rationale.

The plate 150 is separated from the plurality of vacuum distributors 110 in FIG. 16 for illustrative purposes. As a result, an interior plate surface 152 is viewable. Traditionally, the interior plate surface 152 is mated with a bottom portion of the plurality of vacuum distributors 110, forming an air-tight bond.

The vacuum tool 100 is comprised of a plurality of vacuum generators 102, vacuum distributors 110, and associated vacuum distribution cavities 140. It is contemplated that any number of each may be utilized in a vacuum tool 100. For example, it is contemplated that 10, 8, 6, 4, 2, 1, or any number of units may be combined to form a cohesive vacuum tool 100. Further, any footprint may be formed. For example, while a rectangular footprint is depicted in FIG. 16, it is contemplated that a square, triangular, circular, non-circular, part-matching shape, or the like may instead be implemented (e.g., the units may be modular such that depending on the material to be manipulated additional units may be added or removed from the vacuum tool 100. A coupling mechanism may couple a first vacuum distributor 110 with one or more additional vacuum distributors 110 to form the vacuum tool 100). Additionally, the size of the vacuum generator 102 and/or the vacuum distributor 110 may be varied (e.g., non-uniform) in various aspects. For example, in an exemplary aspect, where a greater concentration of vacuum force is needed for a particular application, a smaller vacuum distributor may be utilized, and where a less concentrated vacuum force is needed, a larger vacuum distributor may be implemented.

FIGS. 16-25 depict exemplary manufacturing tools 10; however, it is understood that one or more components may be added or removed from each aspect. For example, each aspect is comprised of an ultrasonic welder 200 and a vacuum tool 100, but it is contemplated that the ultrasonic welder may be eliminated all together. Similarly, it is contemplated that one or more additional ultrasonic welders 200 may be implemented in conjunction with the various aspects. Further, it is contemplated that additional features may also be incorporated. For example, vision systems, adhesive applicators (e.g., spray, roll, hot-melt, and other application methods), mechanical fastening components, pressure applicators, curing devices (e.g., ultraviolet light, infrared light, heat applicators, and chemical applicators), lasers, heat welders, arc welders, microwaves, other energy concentrating fastening devices, and the like may also be incorporated in whole or in part in exemplary aspects. For example, any of the above referenced fastening tools (e.g., adhesive applicators, mechanical fasteners, welders, and the like) may be used in addition to or instead of an ultrasonic welder as discussed herein. Therefore, aspects contemplate alternative fastening tools used in conjunction with one or more vacuum tools.

The ultrasonic welder 200, in an exemplary aspect, is comprised of a stack comprised of an ultrasonic welding horn 210 (may also be referred to as a sonotrode), a converter 220 (may also be referred to as a piezoelectric transducer), and a booster (not labeled). The ultrasonic welder 200 may further be comprised of an electronic ultrasonic generator (may also be referred to as a power supply) and a controller. The electronic ultrasonic generator may be useable for delivering a high-powered alternating current signal with a frequency matching the resonance frequency of the stack (e.g., horn, converter, and booster). The controller controls the delivery of the ultrasonic energy from the ultrasonic welder to one or more parts.

Within the stack, the converter converts the electrical signal received from the electronic ultrasonic generator into a mechanical vibration. The booster modifies the amplitude of the vibration from the converter. The ultrasonic welding horn applies the mechanical vibration to the one or more parts to be welded. The ultrasonic welding horn is comprised of a distal end 212 adapted for contacting a part. For example, the distal end 212 may be formed so as to effectively transmit the mechanical vibration to the part while limiting the necessary time, pressure, and/or surface area necessary for a particular weld. For example, the distal end may be adapted to result in a welding head spot size of a particular size for the materials to be welded. The ultrasonic welding head spot size may be in a diameter range from 1 mm to 8 mm, or in particular at/about 4 mm, 4.5 mm, 5 mm, 5.5 mm, 6 mm, and/or 6.5 mm in diameter. Further, a variety ultrasonic welding frequencies may be implemented, such as 15 kHz to 70 kHz. In an exemplary aspect, the welding frequency may be 15 kHz to 35 kHz, 25 kHz to 30 kHz, 26 kHz, 27 kHz, 28 kHz, and/or 29 kHz. Various other power utilization variables may be altered. For example, power consumption may also include wattage of the ultrasonic welder. The wattage may be adjusted based on the material, time, pressure, thickness, weld penetration, etc. In an exemplary aspect, the wattage may be about 300 watts.

The ultrasonic welder 200 may be positioned at a plurality of locations relative to the vacuum tool 100. For example, the ultrasonic welder may be located at any location along the perimeter of the vacuum tool 100. Further, it is contemplated that the ultrasonic welder 200 is offset from the perimeter of the vacuum tool 100 at any distance. In an exemplary aspect, the ultrasonic welder 200 is located along the perimeter proximate the coupling member 300 to minimize movement of the manufacturing tool 10 when transitioning from vacuum to welding. Further, it is contemplated that a plurality of ultrasonic welders 200 are utilized at a variety of location about the vacuum tool 100 to further reduce travel time of the manufacturing tool 10. Further yet, it is contemplated that one or more ultrasonic welding tools are integrated into the vacuum tool 100. For example, an ultrasonic welder may be integrated at a location between two discrete vacuum distributors (e.g., location of reduced material portions 113); such that an ultrasonic welder 200 may extend from a top surface of the vacuum tool 100 through to the exterior plate surface 158. Therefore, it is contemplated that any fastening tool (such as an ultrasonic welder) may extend through the top surface of the vacuum tool through the exterior plate 158 at any location and at any orientation relative to the vacuum tool. As will be discussed in further detail with respect to FIG. 25, a biasing mechanism may also be implemented to allow portions of the vacuum tool 100 to apply a greater compressive force than utilized by the ultrasonic welder 200 (e.g., to provide stabilization of the parts to be welded).

Figure 17:
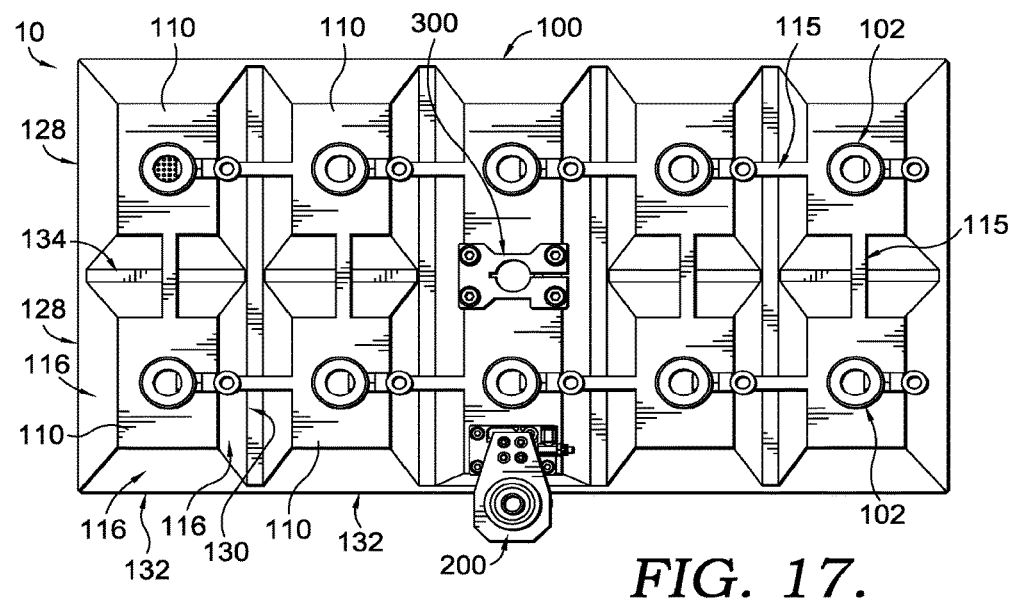
FIG. 17 depicts a top-down perspective view of the manufacturing tool previously depicted in FIG. 16, in accordance with aspects of the present invention.

FIG. 17 depicts a top-down view of the manufacturing tool 10 previously depicted in FIG. 16, in accordance with aspects of the present invention. The top perspective of FIG. 17 provides an exemplary view of a potential orientation of a plurality of vacuum distributors 110 to form a vacuum tool 100. As will be discussed hereinafter with respect to FIG. 20, various vacuum generator 102/vacuum distributor 110 combinations may be selectively activated and/or deactivated to manipulate particular parts.

Figure 18:
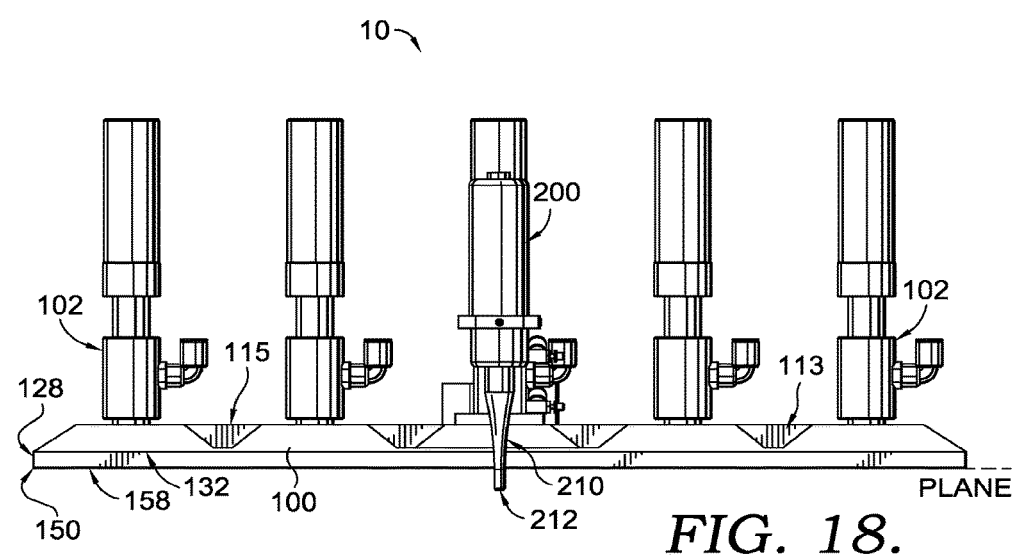
FIG. 18 depicts a side-perspective view of the manufacturing tool previously depicted in FIG. 16, in accordance with aspects of the present invention.

FIG. 18 depicts a side-perspective view of the manufacturing tool 10 previously depicted in FIG. 16, in accordance with aspects of the present invention. The distal end 212 of the horn 210 extends below a plane defined by the exterior plate surface 158. As a result of the distal end 212 extending beyond the plane, the distal end 212 may contact material without interference from the vacuum tool 100 portion of the manufacturing tool 10. However, it is contemplated that the distal end 212 extends approximately even with the exterior plate surface 158 plane. Further, it is contemplated that the distal end 212 does not extend through the plane defined by the exterior plate surface 158 plane. In this example, it is contemplated that the vacuum tool 100 is moveably couple to the coupling member allowing the exterior plate surface 158 plane to move relative to the distal end 212 (e.g., biasing mechanism, such as springs and/or pneumatics, may allow the exterior plate surface 158 plane to move upwards once a sufficient pressure is applied to the exterior plate surface 158). Further yet, it is contemplated that the distal end 212 (and/or the ultrasonic welder 200 in general) is oriented on the manufacturing tool 10 such that a rotation about an axis by the positional member 310 alters a material manipulating plane from that defined by the exterior plate surface 158 plane to a plane defined by the distal end 212 (e.g., the vacuum tool 100 is rotated from being parallel to the materials being manipulated until the ultrasonic welder 200 is perpendicular (or any acceptable angle) to the material to be welded). Stated differently, it is contemplated that instead of positioning the distal end 212 in an appropriate location utilizing X-Y-Z movements, a rotation about an X-axis, Y-axis, and/or Z-axis may be implemented to position the distal end 212.

Figure 19:
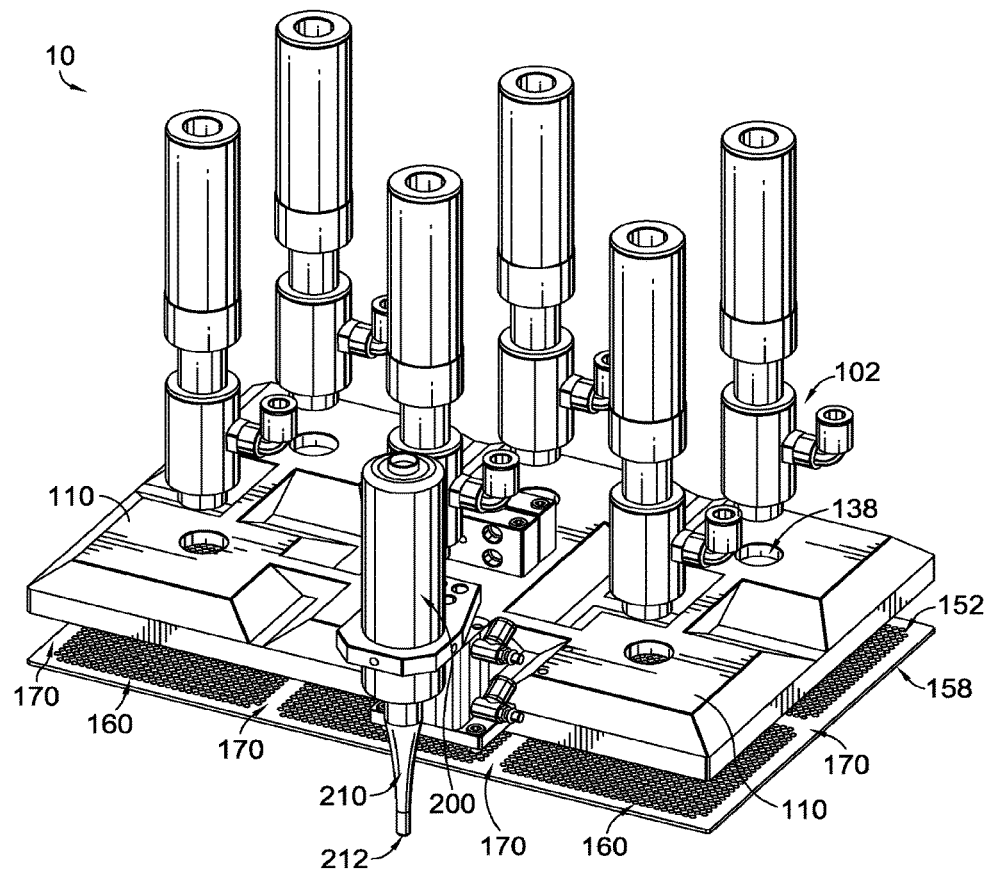
FIG. 19 depicts an exploded-perspective view of a manufacturing tool comprised of six discrete vacuum distributors, in accordance with aspects of the present invention.

FIG. 19 depicts an exploded-perspective view of a manufacturing tool 10 comprised of six discrete vacuum distributors 110, in accordance with aspects of the present invention. The plate 150 is depicted in this exemplary aspect as having a plurality of apertures 160 and non-aperture portions 170. The non-aperture portion 170 is a portion of the plate 150 through which apertures do not extend. For example, along a segment where two vacuum distributors 110 converge the plate 150 may include a non-aperture portion 170 to prevent cross feeding of vacuum between two associated vacuum distribution cavities 140. Further, it is contemplated that non-aperture portion 170 may extend along a segment in which the plate 150 is bonded (temporarily or permanently) to one or more portions of the vacuum distributor(s) 110. Further yet, it is contemplated that one or more non-aperture portions are integrated into the plate 150 to further control the placement of vacuum forces as dispersed along the exterior plate surface 158. Additionally, the non-aperture portion 170 may be implemented in an area intended to be in contact with malleable (and other characteristics) portions of material that may not react well to the application of vacuum as transferred by one or more apertures.

Figure 20:
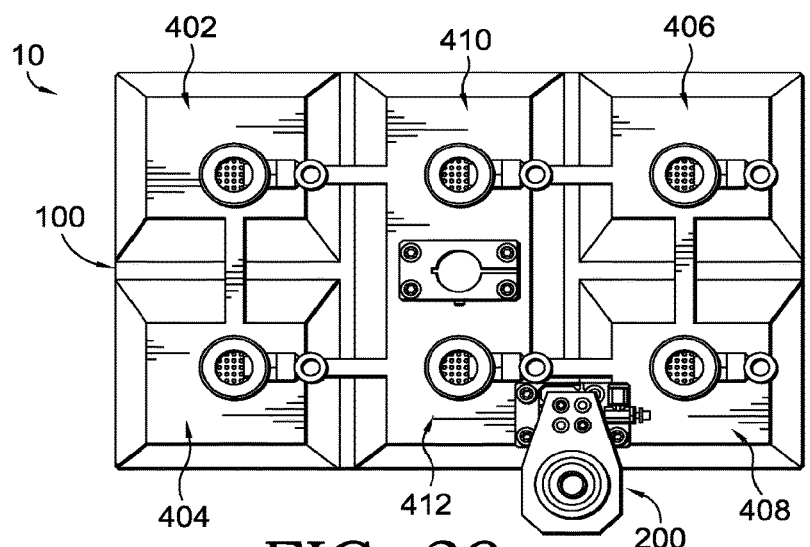
FIG. 20 depicts a top-down perspective of the manufacturing tool previously discussed with respect to FIG. 19, in accordance with exemplary aspects of the present invention.

FIG. 20 depicts a top-down perspective of the manufacturing tool 10 previously discussed with respect to FIG. 19, in accordance with exemplary aspects of the present invention. In particular six discrete vacuum tool portions are identified as a first vacuum portion 402, a second vacuum portion 404, a third vacuum portion 406, a fourth vacuum portion 408, a fifth vacuum portion 410, and a fifth vacuum portion 412. In an exemplary aspect of the present invention, one or more vacuum portions may be selectively activated and deactivated. It is understood that this functionality may be applied to all aspects provided herein, but are only discussed with respect to the present FIG. 20 for brevity reasons.

Figure 21:
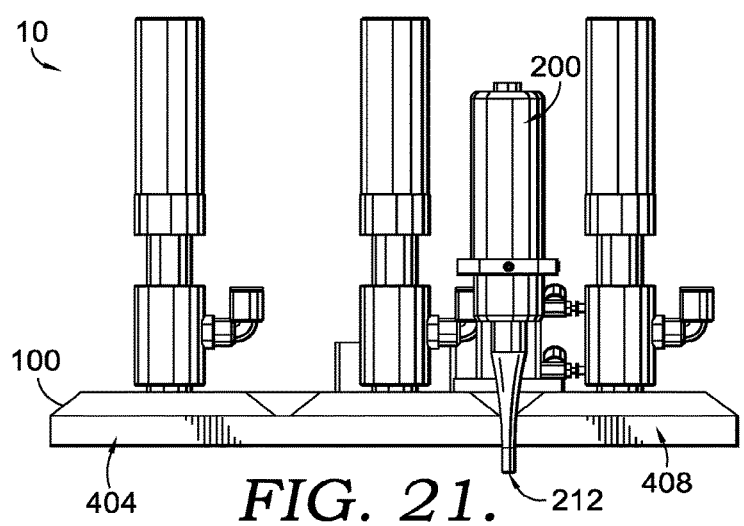
FIG. 21 depicts a side perspective of the manufacturing tool of FIG. 19, in accordance with aspects of the present invention.

FIG. 21 depicts a side perspective of the manufacturing tool 10 of FIG. 19, in accordance with aspects of the present invention.

Figure 22:
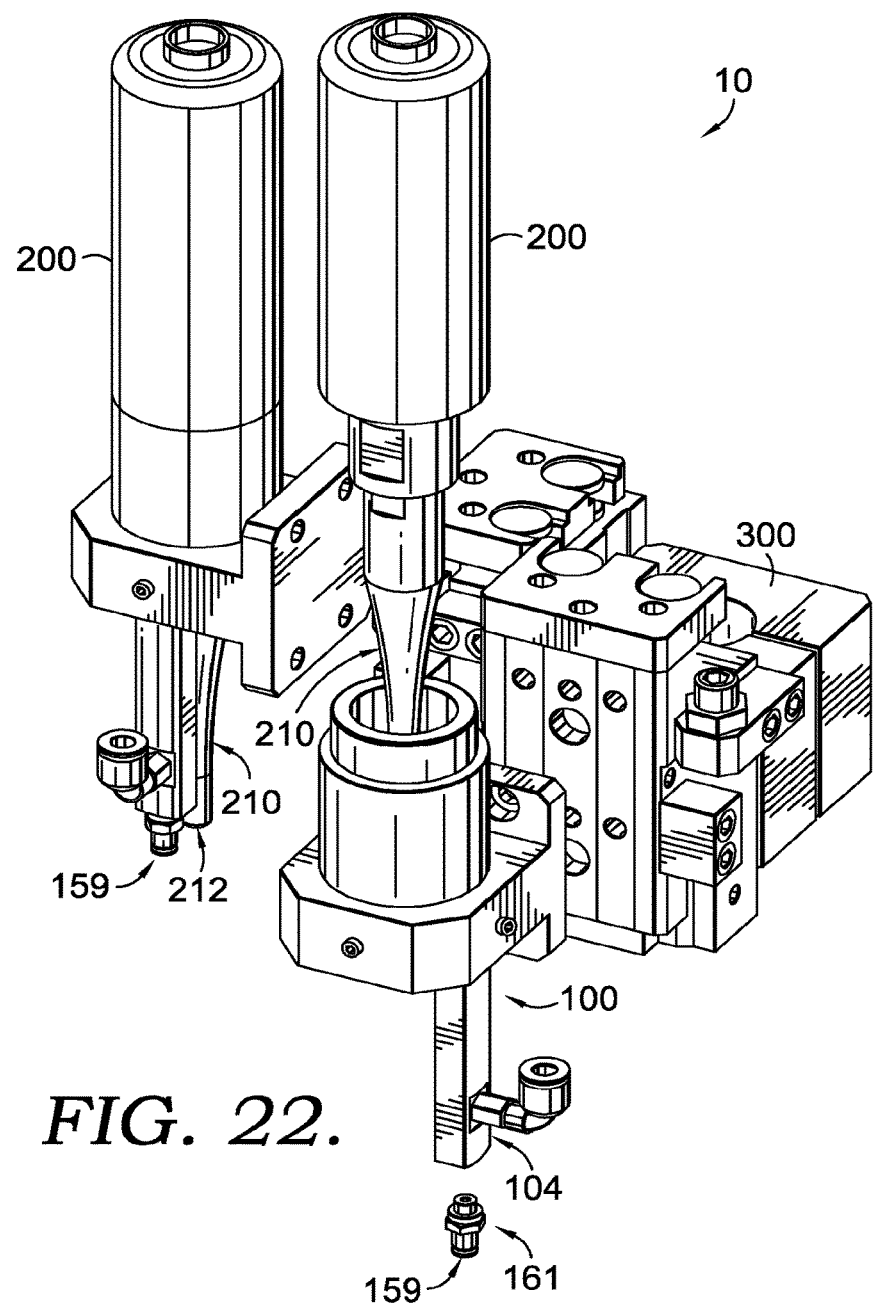
FIG. 22 depicts a manufacturing tool comprised of a vacuum generator and an ultrasonic welder, in accordance with aspects of the present invention.

FIG. 22 depicts a manufacturing tool 10 comprised of a vacuum tool 100 and an ultrasonic welder 200, in accordance with aspects of the present invention. In particular, the vacuum tool 100 of FIG. 22 is a venturi vacuum generator 104. A venturi vacuum generator, similar to a coandă effect vacuum pump, utilizes pressurized air to generate a vacuum force. The vacuum tool 100 of FIG. 22 differs from the vacuum tool 100 of the previously discussed figures in that the vacuum tool 100 of FIG. 22 utilizes a single aperture as opposed to a plate having a plurality of apertures. In an exemplary aspect, the concentration of vacuum force to a single aperture may allow for higher degree of concentrated part manipulation. For example, small parts that may not require even a whole single portion of a multi-portion vacuum tool to be activated may benefit from manipulation by the single aperture vacuum tool of FIG. 22. However, additional aspects contemplate utilizing a plate having a plurality of apertures that are not intended for contacting/covered-by a to-be manipulated part (e.g., resulting in a loss of suction that may traditionally be undesirable).

The single aperture vacuum tool of FIG. 22 utilizes a cup 161 for transferring the vacuum force from the venturi vacuum generator 104 to a manipulated part. The cup 161 has a bottom surface 159 that is adapted for contacting a part. For example, a surface finish, surface material, or size of the bottom surface may be suitable for contacting a part to be manipulated. The bottom surface 159 may define a plane similar to the plane previously discussed as being defined from the exterior plate surface 158 of FIG. 18, for example. As such, it is contemplated that the distal end 212 of the ultrasonic welder 200 may be defined relative to the plane of the bottom surface 159.

It is contemplated that the cup 161 may be adjusted based on a part to be manipulated. For example, if a part has a certain shape, porosity, density, and/or material, then a different cup 161 may be utilized.

While two combinations of vacuum tool 100 and ultrasonic welder 200 are depicted as forming the manufacturing tool 10 of FIG. 22, it is contemplated that any number of features may be implemented. For example, a plurality of vacuum tools 100 may be utilized in conjunction with a single ultrasonic welder 200. Similarly, it is contemplated that a plurality of ultrasonic welders 200 may be implemented in conjunction with a single vacuum tool 100. Further, it is contemplated that various types of vacuum tools may be implemented in conjunction. For example, a manufacturing tool 10 may be comprised of a single aperture vacuum tool and a multi-aperture vacuum tool (e.g., FIG. 1). Further yet, it is contemplated that one or more single aperture vacuum tools are coupled with one or more multi-aperture vacuum tools and one or more fastening tools. As such, any number of features (e.g., tools) may be combined.

Figure 23:
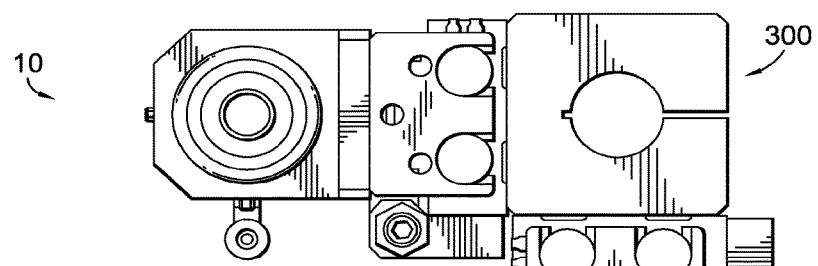
FIG. 23 depicts a top-down perspective of the manufacturing tool of FIG. 22, in accordance with aspects of the present invention.

FIG. 23 depicts a top-down perspective of the manufacturing tool of FIG. 22, in accordance with aspects of the present invention.

Figure 24:
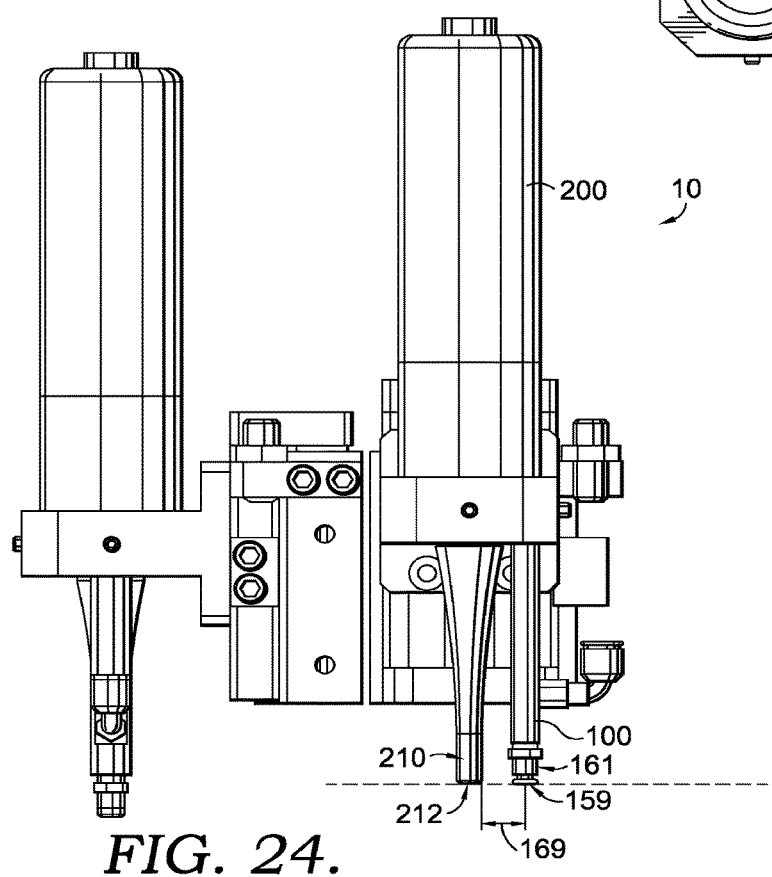
FIG. 24 depicts a side perspective of the manufacturing tool of FIG. 22, in accordance with aspects of the present invention.

FIG. 24 depicts a side perspective of the manufacturing tool of FIG. 22, in accordance with aspects of the present invention. An offset distance 169 may be adjusted for the manufacturing tool 10. The offset distance 169 is a distance between the distal end 212 of the ultrasonic welder 200 and the cup 161. In an exemplary aspect, the distance 169 is minimized to reduce manufacturing tool 10 travels from placing a part to welding the part. However, in another exemplary aspect, the distance 169 is maintained sufficient distance to prevent interference in the manipulation or welding operations by the other tool portion.

Figure 25:
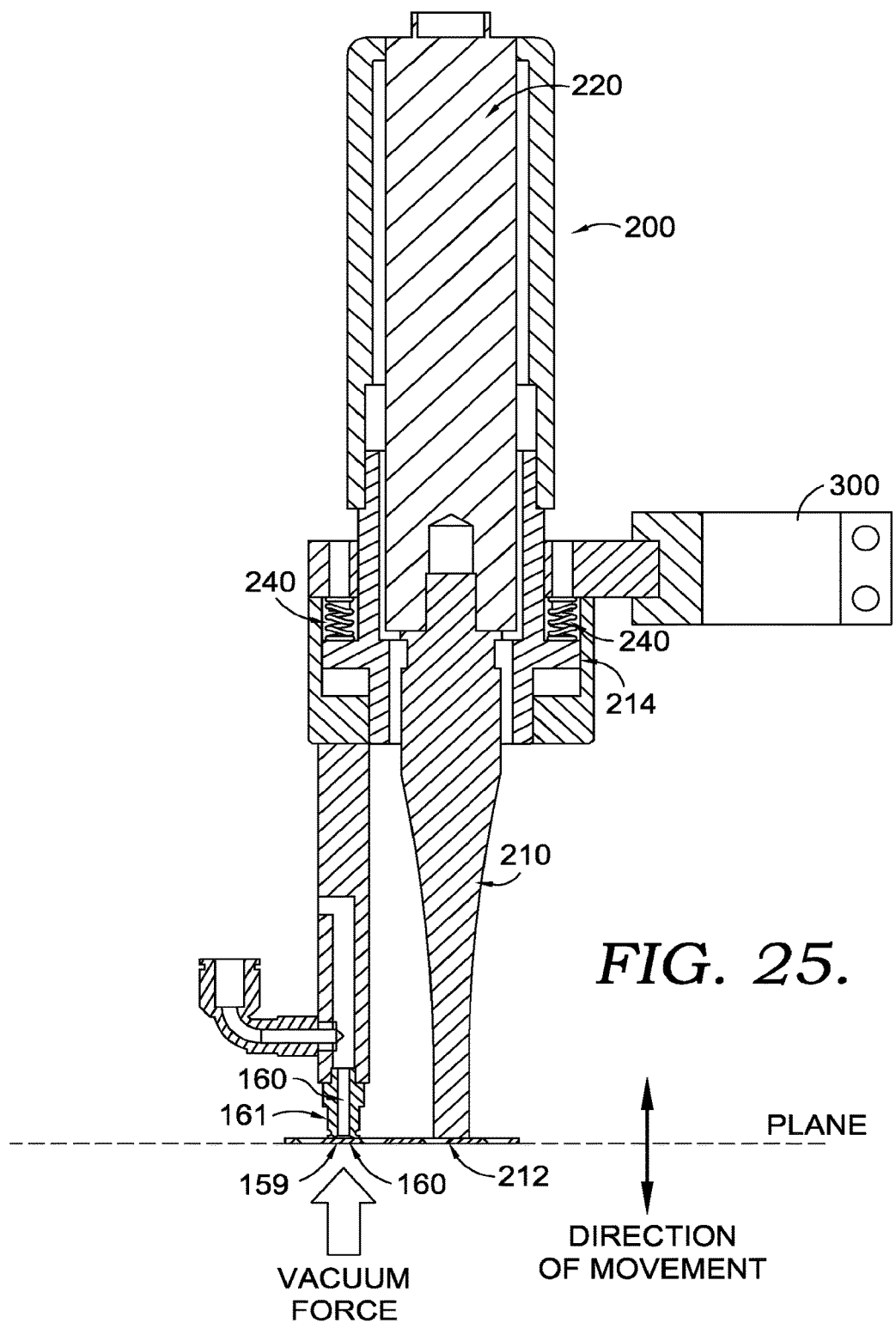
FIG. 25 depicts a cut side perspective view of a manufacturing tool comprised of a single aperture vacuum tool and an ultrasonic welder, in accordance with aspects of the present invention.

FIG. 25 depicts a cut side perspective view of a manufacturing tool 10 comprised of a single aperture 160 and an ultrasonic welder 200, in accordance with aspects of the present invention. The manufacturing tool 10 of FIG. 25 incorporates a moveable coupling mechanism by which the ultrasonic welder 200 is allowed to slide in a direction perpendicular to a plane defined by the bottom surface 159. To accomplish this exemplary moveable coupling, a biasing mechanism 240 is implemented to regulate an amount of pressure the distal end 212 exerts on a part, regardless of pressure being exerted in the same direction by way of the coupling member 300. In this example a flange 214 slides in a channel that is opposed by the biasing mechanism 240. While a spring-type portion is illustrated as the biasing mechanism 240, it is contemplated that any mechanism may be implemented (e.g., gravity, counter weight, pneumatic, hydraulic, compressive, tensile, springs, and the like).

In use, it is contemplated that a force may be exerted onto a part by the manufacturing tool 10 that is greater than necessary for the welding of the part by the ultrasonic welder 200. As a result, the greater force may be effective for maintaining a part during a welding operation, while the biasing mechanism 240 may be used to apply an appropriate pressure force for a current welding operation. Further, it is contemplated that the biasing mechanism may also be used as a dampening mechanism to reduce impact forces experienced by one or more portions of the manufacturing tool 10 when contacting objects (e.g., parts, work surface).

In use, it is contemplated that a force may be exerted onto a part by the manufacturing tool 10 that is greater than necessary for the welding of the part by the ultrasonic welder 200. As a result, the greater force may be effective for maintaining a part during a welding operation, while the biasing mechanism 240 may be used to apply an appropriate pressure force for a current welding operation. For example, it is contemplated that the biasing mechanism 240 may allow for movement of the distal end 212 over a range of distances. For example, the range may include 1 mm to 10 mm, 3-6 mm, and/or about 5 mm. Further, it is contemplated that the biasing mechanism may also be used as a dampening mechanism to reduce impact forces experienced by one or more portions of the manufacturing tool 10 when contacting objects (e.g., parts, work surface).

Further yet, it is contemplated that instead of (or in addition to) utilizing a biasing mechanism, an amount of force exerted by an ultrasonic welder 200 (or any fastening device) may be adjusted based on the material to be bonded. For example, a determined percentage of compression may be allowed for the materials to be bonded such that an offset height of the distal end from the plate bottom surface may be adjusted to allow for the determined level of compression for particular materials. In practice, highly compressible material may allow for a greater distance between a distal end of the fastening tool and the bottom surface of the vacuum plate as compared to non-highly compressible materials that would not allow for the same amount of compression (measured by size or force).

Further, it is contemplated that the vacuum tool 100 is alternatively or additionally implementing a biasing mechanism. For example, in an exemplary aspect of the present invention, the amount of pressure exerted by the vacuum tool 100 may be desired to be less than a pressure exerted by the distal end 212 on the part. As a result, a form of biasing mechanism 240 may be employed to controllably exert pressure on to a part by the vacuum tool 100.

An amount of force that may be exerted by a distal end having a biasing mechanism (or not having a biasing mechanism) may range from 350 grams to 2500 grams. For example, it is contemplated that the amount of force exerted by the distal end on a part may increase as an amount of distance traveled by a biasing mechanism increases. Therefore, a relationship (e.g., based on a coefficient of the biasing mechanism) may dictate an amount of pressure applied based on a distance traveled. In an exemplary operation, such as affixing a base material, a mesh material, and a skin during a welding operation, about 660 grams of force may be exerted. However, it is contemplated that more or less force may be utilized.

Figure 26:
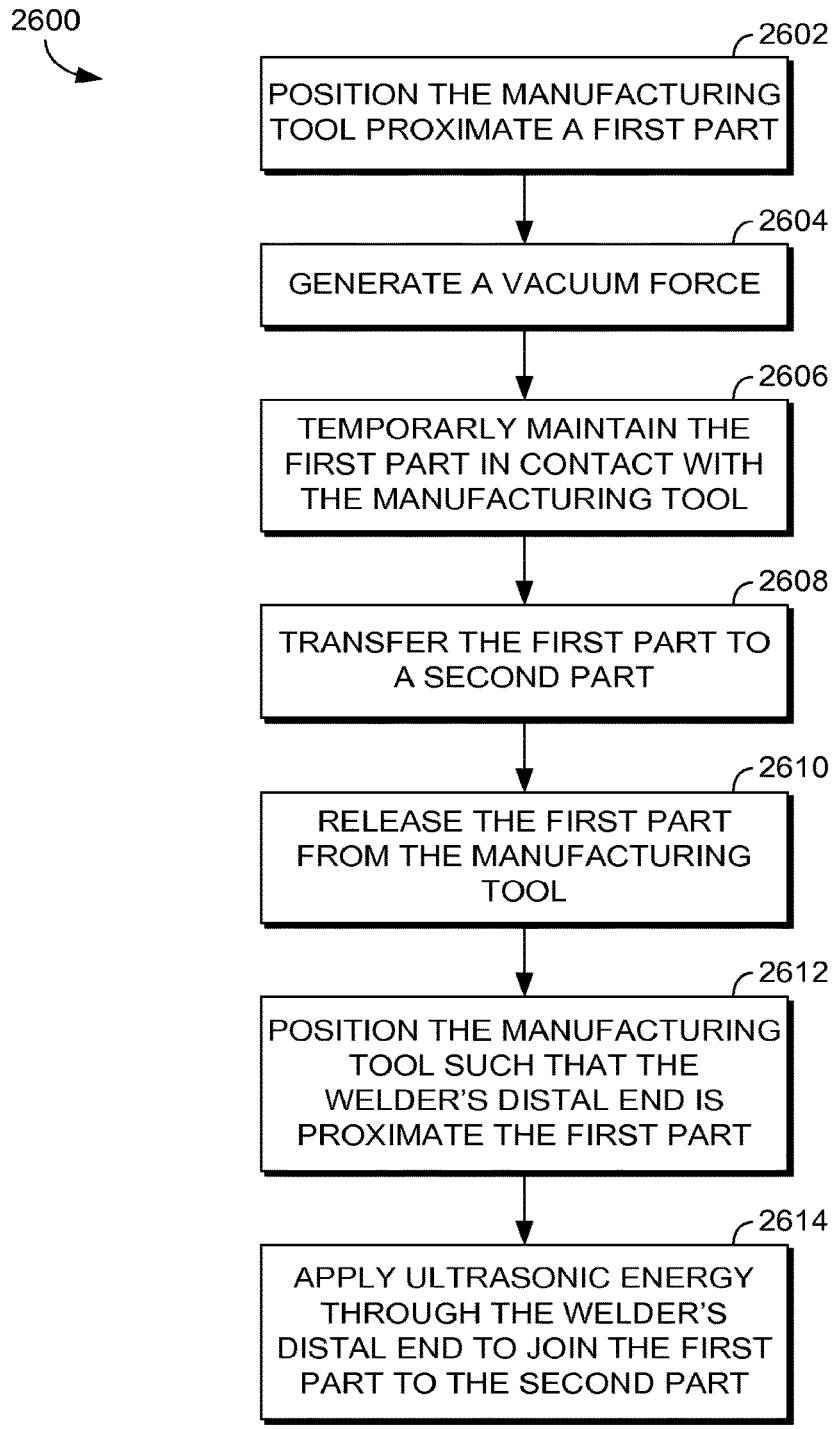
FIG. 26 depicts a method for joining a plurality of manufacturing parts utilizing a manufacturing tool comprised of a vacuum tool and an ultrasonic welder, in accordance with aspects of the present invention.

FIG. 26 depicts a method 2600 for joining a plurality of manufacturing parts utilizing a manufacturing tool 10 comprised of a vacuum tool 100 and an ultrasonic welder 200, in accordance with aspects of the present invention. A block 2602 depicts a step of positioning the manufacturing tool 10 such that the vacuum tool 100 is proximate a first part. As used herein, the term proximate may refer to a physical relationship that includes being at, on, and near. For example, the manufacturing tool may be proximate a location when it is within a length or width of the manufacturing tool from the location. Further, it is contemplated that the manufacturing tool is proximate a location when the manufacturing tool is at a location defined to be within tolerance of the part to be manipulated. The positioning of the manufacturing tool 10 may be accomplished by a positional member 310, previously discussed.

A block 2604 depicts a step of generating a vacuum force transferred through a bottom surface of the vacuum tool 100. For example, one or more of the vacuum generators 102 may be activated (e.g., as a whole, selectively) to generate a vacuum force that results in a suction effect attracting a part to the exterior plate surface 158 of FIG. 19 (or the bottom surface 159 of FIG. 22). As previously discussed, it is contemplated that one or more vacuum portions may be selectively activated (or deactivated) depending on a desired amount of vacuum force and a desire location of vacuum force.

A block 2606 depicts a step of temporarily maintaining the first part in contact with at least a portion of the vacuum tool 100. Therefore, once a vacuum is applied to a part and the part is attracted to the vacuum tool 100, the part is maintained in contact with the vacuum tool 100 so that if the vacuum tool moves (or an underlying supporting surface of the part moves) the part will stay with the vacuum tool. The term temporarily is utilized in this sense so as not to imply a permanent or otherwise significant bond that requires significant effort to separate the part from the vacuum tool. Instead, the part is "temporarily" maintained for the duration that a sufficient vacuum force is applied.

A block 2608 depicts a step of transferring the first part to a second part. The first part may be transferred though a movement of the manufacturing tool 10. Further, it is contemplated that the transferring of the first part may be accomplished through the movement of the second part to the first part (e.g., underlying conveyor system brings the second part towards the first part).

A block 2610 depicts a step of releasing the first part from the vacuum tool 100. For example, it is contemplated that stopping the generation of vacuum pressure by one or more vacuum generators 102 is sufficient to effectuate the release of the first part. Further, it is contemplated that a burst of air that is insufficient to generate a vacuum (e.g., insufficient to take advantage of a coandă effect) in the vacuum generator 102, but sufficient to cause the release the part may be implemented.

Further, it is contemplated that the releasing of the first part further comprises activating another mechanism that opposes the vacuum pressure of the vacuum tool 100. For example, a work surface (e.g., conveyor, table top) opposite of the vacuum tool 100 may generate a vacuum pressure that counters the vacuum of the vacuum tool. This may allow for precise placement and maintaining of the part as the vacuum tool again transitions to a new position. The countering vacuum pressure may be generated with a mechanical vacuum (e.g., blower) as cycling off and on may not be needed at the same rate as the vacuum tool 100.

In an exemplary aspect of the present invention, it is contemplated that a work surface vacuum and a vacuum tool vacuum may have the following on/off relationship for exemplary processes, as depicted in the following tables. While exemplary process are indicated, it is contemplated that additional processes may be substituted or re-arranged within the process. Further, a manufacturing surface, as used herein, reference to a moveable article that may form a base for initially securing, maintaining, aligning, or otherwise assisting in the manufacturing of a product resulting from the manipulated part(s).

Simplified Operations Table

| Operation | Work Surface Vacuum | Vacuum Tool Vacuum |
|---|---|---|
| Initial State | Off | Off |
| Manufacturing surface arrives | On | Off |
| Robot starts to move vacuum tool for part pickup | On | Off |
| Robot reaches X % distance from part | On | On |
| Robot begins moving vacuum tool with part to place the part | On | On |
| Place the part | On | Off |
| Affixing of part (e.g., welding) | On | Off |
| End state | On | Off |

Additional Operations Table

| Operation | Work Surface Vacuum | Vacuum Tool Vacuum |
|---|---|---|
| Initial State | Off | Off |
| Manufacturing surface arrives | On | Off |
| Robot starts to move vacuum tool for part pickup | On | Off |
| Robot reaches X % distance from part | On | On |
| Robot begins moving vacuum tool with part to place the part | On | On |
| Robot reaches Y % distance from the manufacturing surface | Off | On |
| Wait Z seconds | Off | On |
| Place the part | Off | Off |
| Robot begins moving | Off | Off |
| Robot positions welder | On | Off |
| Affixing of part (e.g., welding) | On | Off |
| End state | On | Off |

Consequently, it is contemplated that any combination of work surface vacuum and vacuum tool vacuum may be utilized to accomplish aspects of the present invention. In an exemplary aspect the work surface vacuum is maintained on while a manufacturing surface is present. As a result, the work surface vacuum may utilize a mechanical vacuum generator that may be more efficient, but requires a start up or wind down time than a coanda or a venturi vacuum generator. Further, a mechanical vacuum generator may be able to generate a greater amount of vacuum force over a larger area than the coanda or venturi vacuum generators typically generate.

A block 2612 depicts a step of positioning the manufacturing tool 10 such that the distal end 212 of the ultrasonic welder 200 is proximate the first part. In this example, it is contemplated that the first part and the second part are intended to be joined utilizing the ultrasonic welder 200. Consequently, the ultrasonic welder is positioned in a manner to apply an ultrasonic induced bond between the first part and the second part.

A block 2614 depicts a step of applying an ultrasonic energy through the horn 210. The application of ultrasonic energy bonds the first and the second part with an ultrasonic weld.

While various steps of the method 2600 have been identified, it is contemplated that additional or fewer steps may be implemented. Further, it is contemplated that the steps of method 2600 may be performed in any order and is not limited to the order presented.

Figure 27:
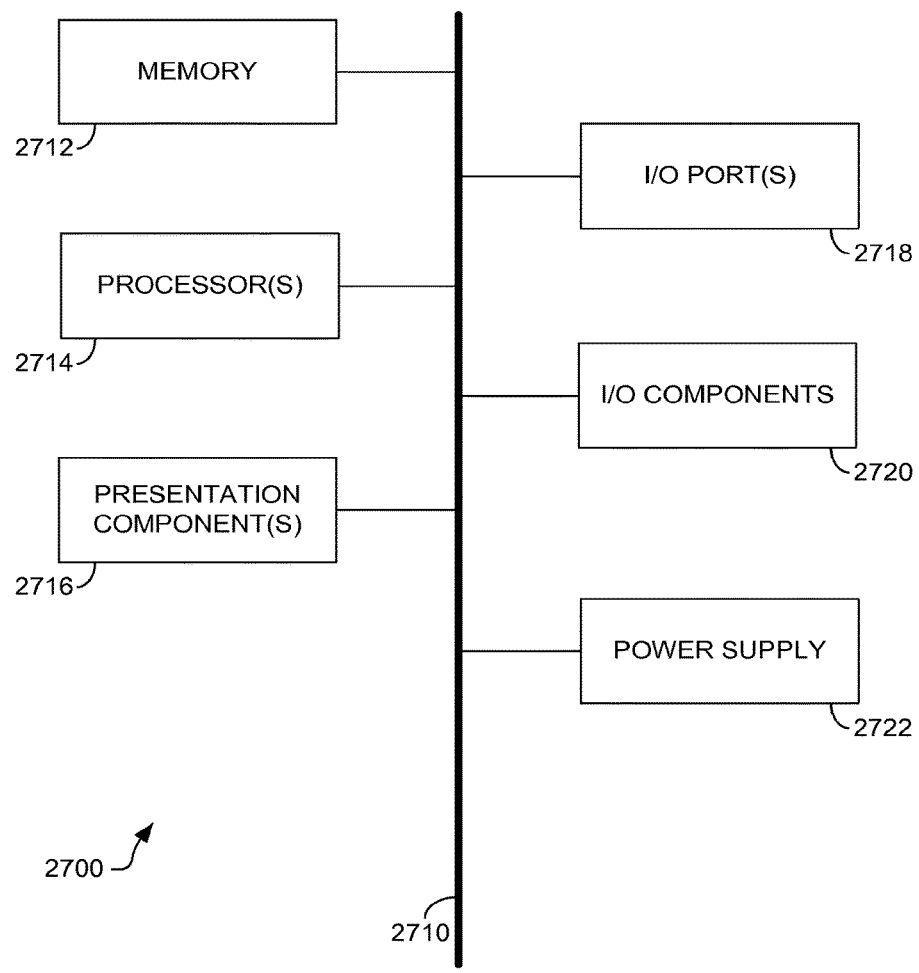
FIG. 27 depicts an exemplary computing device suitable for implementing embodiments of the present invention.

FIG. 27 depicts an exemplary operating environment suitable for implementing embodiments of the present invention, which is shown and designated generally as computing device 2700. Computing device 2700 is but one example of a suitable computing environment and is not intended to suggest any limitation as to the scope of use or functionality of the invention. Neither should the computing device 2700 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant, mobile phone, or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 27, computing device 2700 includes a bus 27270 that directly or indirectly couples the following devices: memory 27272, one or more processors 2714, one or more presentation modules 2716, input/output (I/O) ports 2718, I/O modules 2720, and an illustrative power supply 2722. Bus 27270 represents what may be one or more busses (such as an address bus, data bus, or combination thereof). Although the various blocks of FIG. 27 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 27 is merely illustrative of an exemplary computing device that can be used in connection with one or more embodiments. Distinction is not made between such categories as "workstation," "server," "laptop," "hand-held device," etc., as all are contemplated within the scope of FIG. 27 and reference to "computer" or "computing device."

Computing device 2700 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 2700.

Memory 2712 includes non-transitory computer-storage media in the form of volatile and/or nonvolatile memory. The memory may be removable, non-removable, or a combination thereof. Exemplary hardware devices include solid-state memory, hard drives, optical-disc drives, etc. Computing device 2700 includes one or more processors that read data from various entities such as memory 2712 or I/O modules 2720. Presentation module(s) 2716 present data indications to a user or other device. Exemplary presentation modules include a display device, speaker, printing module, vibrating module, and the like. I/O ports 2718 allow computing device 2700 to be logically coupled to other devices including I/O modules 2720, some of which may be built in. Illustrative modules include a microphone, keyboard, input device, scanner, printer, wireless device, and the like.

Additional arrangements, features, combinations, sub-combination, steps, and the like are contemplated within the provided disclosure. As such, additional embodiments are inherently disclosed by the provided discussion.

What is claimed is:

1. A method of positioning and joining manufacturing parts using a manufacturing tool comprising (1) a pickup tool having a part-contacting surface and a plurality of pickup force generators that provide independently activated and deactivated pickup force in respectively associated portions of the part-contacting surface, and (2) a welding tool, the method comprising:

positioning the manufacturing tool such that the part-contacting surface is proximate to a first manufacturing part;

generating a first pickup force at a first portion of the part-contacting surface using a first pickup force generator associated with the first portion of the part-contacting surface;

temporarily maintaining the first manufacturing part against the first portion of the part-contacting surface;

transferring the first manufacturing part to a second manufacturing part using the manufacturing tool;

releasing the first manufacturing part from the pickup tool by deactivating the first pickup force;

positioning the manufacturing tool such that the welding tool is proximate to a location at which the first manufacturing part is in contact with the second manufacturing part; and welding the first manufacturing part to the second manufacturing part at the location using the welding tool.

2. The method of claim 1, wherein the first manufacturing part and the second manufacturing part are both shoe parts, and wherein the welding tool is coupled to the pickup tool and positioned at a location about a perimeter of the pickup tool.

3. The method of claim 2, wherein the welding tool is offset from the perimeter at a distance and in fixed relation.

4. The method of claim 1, wherein the pickup tool is electrically-powered.

5. The method of claim 1, wherein the pickup tool is a vacuum-powered part holder, and wherein the part-contacting surface is a portion of a plate comprising a plurality of apertures.

6. The method of claim 5, wherein the welding tool comprises an ultrasonic welding horn.

7. The method of claim 1, wherein the welding tool is integrated into the pickup tool such that it is located between portions of the pickup tool and a distal end of the welding tool extends at least to the part-contacting surface.

8. The method of claim 1, further comprising applying a compressive force to the first and second manufacturing parts utilizing a biasing mechanism coupled to the manufacturing tool.

9. The method of claim 1, wherein the respectively associated portions of the part-contacting surface are coplanar.

10. A method of positioning and joining manufacturing parts using a manufacturing tool comprising (1) a pickup tool comprising a part-contacting surface and a plurality of pickup force generators that provide independent activation and deactivation of pickup force in respectively associated portions of the part-contacting surface, and (2) a welding tool, the method comprising:

positioning the manufacturing tool such that the part-contacting surface is proximate to a first manufacturing part;

generating at least one of:

a first pickup force at a first portion of the part-contacting surface with a first pickup force generator associated with the first portion of the part-contacting surface, and a second pickup force at a second portion of the part-contacting surface with a second pickup force generator associated with the second portion of the part-contacting surface;

temporarily maintaining the first manufacturing part in contact with the part-contacting surface;

transferring the first manufacturing part to a second manufacturing part using the manufacturing tool;

releasing the first manufacturing part at the second manufacturing part;

positioning the manufacturing tool such that the welding tool is proximate a location at which the first manufacturing part is in contact with the second manufacturing part; and welding the first manufacturing part to the second manufacturing part at the location using the welding tool.

11. The method of claim 10, wherein the respectively associated portions of the part-contacting surface are malleable and coplanar.

12. The method of claim 10, wherein the pickup tool comprises a vacuum-powered part holder and the welding tool comprises an ultrasonic welding horn.

13. The method of claim 10, wherein the welding tool is located within a perimeter of the pickup tool, and wherein a distal end of the welding tool extends at least to a plane defined by the part-contacting surface.

14. The method of claim 10, wherein the pickup tool is electrically-powered.

15. The method of claim 10, wherein the pickup tool and the welding tool are coupled together in fixed relation and offset a distance.

16. The method of claim 10, wherein the pickup tool and the welding tool are movable relative to each other.

17. The method of claim 10, wherein the manufacturing tool is attached to a robot that positions the manufacturing tool at different locations.

18. A method of positioning and joining manufacturing parts using a manufacturing tool comprising (1) a pickup tool having a part-contacting surface and (2) a fastening tool that is coupled to the pickup tool and offset from a perimeter of the pickup tool at a fixed position, the method comprising:

positioning the manufacturing tool such that the pickup tool is proximate to a first manufacturing part;

generating a first pickup force at the part-contacting surface using a first pickup force generator to lift the first manufacturing part and maintain the first manufacturing part in contact with at least a portion of the part-contacting surface;

transferring the first manufacturing part to a second manufacturing part using the manufacturing tool;

releasing the first manufacturing part such that it is dropped onto the second manufacturing part;

positioning the manufacturing tool such that the fastening tool is positioned proximate a contact location at which the first manufacturing part is in contact with the second manufacturing part while the pickup tool is positioned away from the contact location; and fastening the first manufacturing part to the second manufacturing part at the contact location using the fastening tool.

19. The method of claim 18, wherein the pickup tool comprises a plurality of independently operable pickup force generators that generate independent pickup forces at respective portions of the part-contacting surface.

20. The method of claim 18, wherein the pickup tool is a vacuum-powered part holder and the fastening tool is a welding tool.

* * * * *